(12) United States Patent
Ando et al.

(10) Patent No.: US 11,378,974 B2
(45) Date of Patent: Jul. 5, 2022

(54) INFORMATION PROCESSING DEVICE AND RECORDING MEDIUM RECORDING VEHICLE PARKING SUPPORT PROGRAM

(71) Applicant: FUJITSU LIMITED, Kawasaki (JP)

(72) Inventors: Toshiaki Ando, Yokohama (JP); Kimitaka Murashita, Atsugi (JP); Yasutaka Okada, Kawasaki (JP); Jun Kanetake, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 16/726,432

(22) Filed: Dec. 24, 2019

(65) Prior Publication Data
US 2020/0133297 A1 Apr. 30, 2020

Related U.S. Application Data

(63) Continuation of application No. PCT/JP2017/026741, filed on Jul. 24, 2017.

(51) Int. Cl.
G05D 1/02 (2020.01)
B60W 30/06 (2006.01)
G01C 3/06 (2006.01)

(52) U.S. Cl.
CPC ........... G05D 1/0253 (2013.01); B60W 30/06 (2013.01); G01C 3/06 (2013.01); G05D 2201/0212 (2013.01)

(58) Field of Classification Search
CPC .. G05D 1/0253; G05D 1/0246; G05D 1/0231; G05D 2201/0212; G01C 3/00–32; B60W 30/06; B60W 30/16
See application file for complete search history.

(56) References Cited

U.S. PATENT DOCUMENTS 6,483,429 B1    11/2002   Yasui et al.
2007/0154068 A1  7/2007   Stein et al.
(Continued)

FOREIGN PATENT DOCUMENTS

EP    2824416 A1    1/2015
JP    11-105686 A   4/1999
(Continued)

OTHER PUBLICATIONS

International Search Report and Written Opinion of the International Searching Authority (Form PCT/ISA/210, 220, and 237), mailed in connection with PCT Application No. PCT/JP2017/026741 dated Oct. 3, 2017, 10 pages.
(Continued)

*Primary Examiner* — Aaron L Troost
(74) *Attorney, Agent, or Firm* — Fujitsu Patent Center

(57) ABSTRACT

An information processing device includes a memory and a processor coupled to the memory. The processor acquires a first image at a first time and a second image at a second time later than the first time from a monocular camera mounted on a vehicle, calculates an amount of movement of the vehicle based on a sensor value acquired during a measurement period between the first time and the second time, outputs a result of distance measurement using a first distance measurement method to perform distance measurement using the first image or the second image or a second distance measurement method to perform distance measurement using the first image and the second image, depending on the amount of movement and outputs a result of calculation of a route to guide the vehicle to a parking space, based on the result of distance measurement.

12 Claims, 20 Drawing Sheets

(56) References Cited

U.S. PATENT DOCUMENTS

| | | | |
|---|---|---|---|
| 2011/0273310 A1 | 11/2011 | Kadowaki et al. | |
| 2014/0058656 A1* | 2/2014 | Chen | B62D 15/0285 701/400 |
| 2014/0152780 A1 | 6/2014 | Kanetake et al. | |
| 2014/0362193 A1 | 12/2014 | Kanetake et al. | |
| 2015/0125040 A1 | 5/2015 | Nakayama et al. | |
| 2017/0151883 A1* | 6/2017 | Bae | G05D 1/0246 |
| 2018/0017768 A1 | 1/2018 | Betsui et al. | |
| 2018/0022346 A1* | 1/2018 | Murakami | G08G 1/168 701/37 |
| 2019/0126942 A1* | 5/2019 | Goto | B60Q 9/00 |
| 2020/0284580 A1* | 9/2020 | Sasamoto | G01C 3/14 |

FOREIGN PATENT DOCUMENTS

| | | | |
|---|---|---|---|
| JP | 2001-187553 A | | 7/2001 |
| JP | 2007-17246 A | | 1/2007 |
| JP | 2007-263657 | | 10/2007 |
| JP | 2007263657 A | * | 10/2007 |
| JP | 2012-122911 A | | 6/2012 |
| JP | 2012-159469 A | | 8/2012 |
| JP | 2012-164275 A | | 8/2012 |
| JP | 2014-106092 A | | 6/2014 |
| JP | 2014-109819 A | | 6/2014 |
| JP | 2014-240753 A | | 12/2014 |
| JP | 2015-88092 A | | 5/2015 |
| JP | 2015-206798 A | | 11/2015 |
| WO | 2010/098170 A1 | | 9/2010 |
| WO | 2016/121550 A1 | | 8/2016 |

OTHER PUBLICATIONS

EESR—Extended European Search Report of European Patent Application No. 17918986.5 dated Jun. 17, 2020.
EPOA—Official Communication of European Patent Application No. 17918986.5 dated Aug. 4, 2021.

* cited by examiner

FIG. 18

| CAMERA IDENTIFICATION INFORMATION (T11) | OPTICAL AXIS DIRECTION (T12) |
|---|---|
| CAMERA #1 | FRONTWARD |
| CAMERA #2 | REARWARD |
| CAMERA #3 | LEFTWARD |
| CAMERA #4 | RIGHTWARD |

INFORMATION PROCESSING DEVICE AND RECORDING MEDIUM RECORDING VEHICLE PARKING SUPPORT PROGRAM

CROSS-REFERENCE TO RELATED APPLICATION

This application is a continuation application of International Application PCT/JP2017/026741 filed on Jul. 24, 2017 and designated the U.S., the entire contents of which are incorporated herein by reference.

FIELD

The present embodiment relates to a vehicle parking support device and a vehicle parking support program for supporting parking of a vehicle by measuring a distance to an object around the vehicle on the basis of an image captured from the vehicle.

BACKGROUND

In a technique (which may also be referred to as a vehicle parking support technique), a target parking position is detected on the basis of an image captured from a camera (which may also be referred to as an in-vehicle camera) mounted in a vehicle (which may also be referred to as a moving body), and the vehicle is controlled from the current position to the target parking position or the driver's operation is supported.

Related art is disclosed in Japanese Laid-open Patent Publication No. 2015-88092, Japanese Laid-open Patent Publication No. 11-105686, International Publication Pamphlet No. WO 2016/121550, Japanese Laid-open Patent Publication No. 2001-187553, Japanese Laid-open Patent Publication No. 2014-109819, Japanese Laid-open Patent Publication No. 2014-106092, Japanese Laid-open Patent Publication No. 2012-164275, and International Publication Pamphlet No. WO 2010/098170.

SUMMARY

According to an aspect of the embodiments, an information processing device includes: a memory; and a processor coupled to the memory and configured to: acquire, as a first process, a first image at a first time and a second image at a second time later than the first time from a monocular camera mounted on a vehicle; calculate, as a second process, an amount of movement of the vehicle, based on a sensor value acquired during a measurement period between the first time and the second time; output, as a third process, a result of distance measurement using a first distance measurement method to perform distance measurement using the first image or the second image, or a second distance measurement method to perform distance measurement using the first image and the second image, depending on the amount of movement; and output, as a fourth process, a result of calculation of a route to guide the vehicle to a parking space, based on the result of distance measurement.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a table showing an example of the contents of camera installation information.

DESCRIPTION OF EMBODIMENTS

Figure 1:
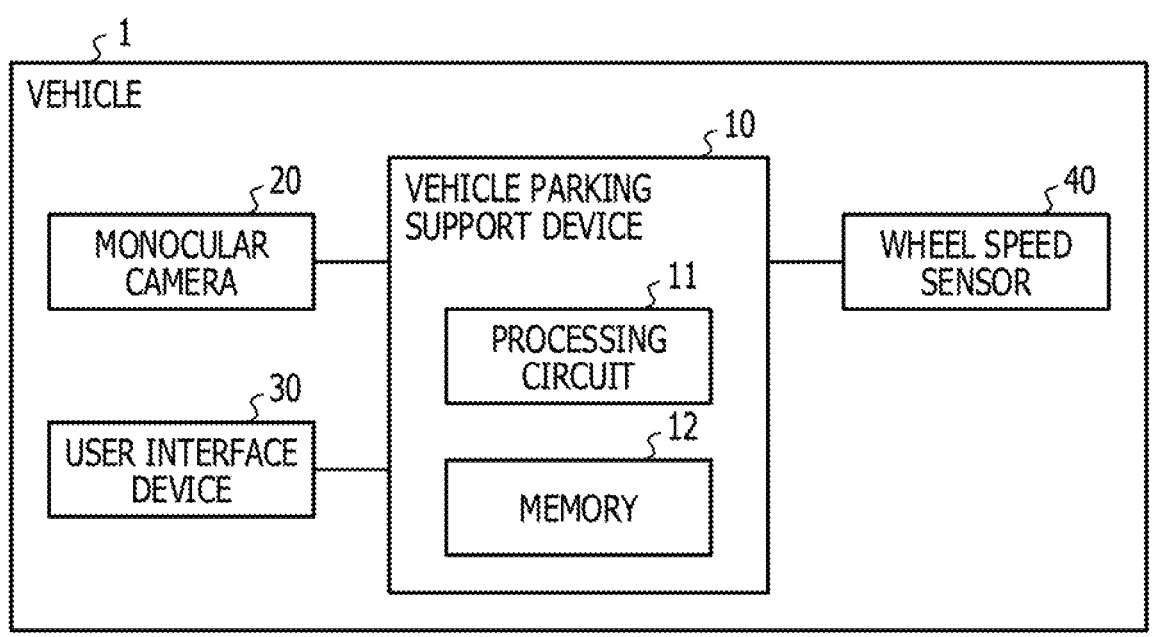
FIG. 1 is a diagram illustrating an example outline of the configuration of a vehicle that includes a vehicle parking support device according to a first embodiment.

For example, to calculate a travelable route, it may be necessary to detect an object (which may also be referred to as the target object) located near the vehicle, and accurately calculate the distance between the object and the vehicle. Further, to detect an object around the vehicle, it is preferable to use a monocular camera, because of the cost of a sensor, restrictions on the mounting position of the sensor, and the like.

Examples of techniques for calculating the distance between an object detected from image data captured by a monocular camera and a vehicle may includes a ground contact position determination technique and a moving stereo technique.

For example, the ground contact position determination technique is a technique for detecting an object from image data captured by a monocular camera through machine learning, an optical flow, or the like at the previous stage, and geometrically calculating the distance between the vehicle and the object, on the basis of the coordinates of the detected object in an image at the ground contact position, a distortion table, the installation position and the orientation of the camera, and the like.

For example, the moving stereo technique is a technique for estimating the distance from a vehicle to an object, on the basis of the amount of movement of the vehicle and a plurality of sets of image data captured by a monocular camera before and after the movement of the vehicle. By the moving stereo technique, the amount of movement of a vehicle can be determined relatively accurately, and a distance can be measured with high precision in a case where the object is not moving.

With the conventional techniques, there are cases where the distance from a moving body such as a vehicle to an object cannot be measured accurately.

By the ground contact position determination technique, for example, an object is detected from an image at one point of time, and therefore, distance measurement accuracy is relatively greatly affected by an error in the pixel position of the detected object.

Meanwhile, the moving stereo technique is a technique for estimating the three-dimensional position of an object by a triangulation method, on the basis of images at a plurality of points of time with time differences and an amount of movement of the vehicle. Therefore, the moving stereo technique requires a sufficient parallax between images. However, while the vehicle is not running, or immediately after a start of running, images with a sufficient parallax cannot be obtained, and distance measurement by the moving stereo technique cannot be performed with sufficiently high precision.

In one aspect, a vehicle parking support device and a vehicle parking support program capable of increasing the accuracy of measurement of the distance from a moving body to an object on the basis of an image captured by a monocular camera may be provided.

The following is a detailed description of embodiments of a vehicle parking support device disclosed in the present application, with reference to the drawings. Note that the embodiments described below do not limit the disclosed technology. It also goes without saying that the respective embodiments described below may be implemented in appropriate combination.

First Embodiment

FIG. 1 is a diagram illustrating an example outline of the configuration of a vehicle 1 including a vehicle parking support device 10 according to a first embodiment. The vehicle 1 illustrated in FIG. 1 includes the vehicle parking support device 10, a monocular camera 20, a user interface device 30, and a wheel speed sensor 40. Note that, in FIG. 1, the driving source such as an engine or a motor for driving the vehicle 1, and the tires and the like are not illustrated.

The vehicle parking support device 10 is a device (that may be called a computer) that is designed to measure a distance around the vehicle 1 on the basis of an image captured from the monocular camera 20 mounted on the vehicle 1, and support the parking of the vehicle 1. The vehicle parking support device 10 illustrated in FIG. 1 includes a processing circuit 11 and a memory 12. The vehicle parking support device 10 is communicably connected to the monocular camera 20, the user interface device 30, and the wheel speed sensor 40 through a vehicle-mounted network such as a controller area network (CAN), for example.

The processing circuit 11 may be an arithmetic device that reads and executes a program (which may also be referred to as a vehicle parking support program) stored in the memory 12, for example, to perform a process according to the first embodiment. In other words, the processing circuit 11 has a function as an executer of the process according to the first embodiment. The processing circuit 11 may be a central processing unit (CPU), a micro-processing unit (MPU), a digital signal processor (DSP), a field programmable gate array (FPGA), or the like, for example. Note that the processing circuit 11 may be a multi-core processor including two or more cores.

The memory 12 is a circuit designed to store and hold the data and the program (which may also be referred to as the vehicle parking support program) related to various processes to be performed by the processing circuit 11. The memory 12 includes a nonvolatile storage device and/or a volatile storage device. Examples of such storage devices include a random access memory (RAM), a read only memory (ROM), a solid-state drive (SSD), a hard disk drive (HDD), and the like. In FIG. 1, the memory 12 is the collective term for various storage devices such as a main storage and an auxiliary storage.

The monocular camera 20 (which may also be referred to as the camera) is a monocular camera mounted on the vehicle 1, and may be a complementary metal oxide semiconductor (CMOS) camera, a charged coupled device (CCD) camera, or the like, for example. In a case where the optical axis of the monocular camera 20 is directed toward the front side of the vehicle 1, the monocular camera 20 may be installed in the front grille, the dashboard, the windshield (which may also be referred to as the front window), or the like of the vehicle 1, for example. In a case where the optical axis of the monocular camera 20 is directed to the rear side of the vehicle 1, the monocular camera 20 may be installed in the rear glass (which may also be referred to as the rear window), the rear garnish, or the like of the vehicle 1, for example. The monocular camera 20 may write the image data of a captured image into the memory 12 of the vehicle parking support device 10 at predetermined intervals (which may also be referred to as the frame rate), for example.

The user interface device 30 is a device designed to output a result of calculation of a route for guiding the vehicle 1 to a parking space, on the basis of a signal from the vehicle parking support device 10. For example, in a case where a route calculation result is visually output, the user interface device 30 may be a display device such as a liquid crystal display device.

The wheel speed sensor 40 is designed to output pulses in accordance with rotation of the car wheels (which may also be referred to as the wheels) of the vehicle 1. For example, the wheel speed sensor 40 may be mounted on the wheel bearing of the vehicle 1, and has an output resolution of several tens of pulses per rotation, in accordance with the rotation of the wheels or the axles. The wheel speed sensor 40 may be a passive sensor system formed with a pickup coil and a pulsar ring, or may be an active sensor system using a magnetic sensor such as a Hall element or a magnetoresistive element, for example.

With the above configuration, the processing circuit 11 of the vehicle parking support device 10 is designed to perform: a first process of reading and executing a program stored in the memory 12, to acquire a first image at a first time and a second image at a second time later than the first time from the monocular camera 20 mounted on the vehicle 1; a second process of calculating the amount of movement of the vehicle 1, on the basis of wheel speed pulses (which may also be referred to as the sensor value) acquired from the wheel speed sensor 40 during the measurement period between the first time and the second time; a third process of outputting a result of distance measurement (which may also be referred to as a measurement result) using a first distance measurement method for measuring a distance with the use of the first image or the second image, or a second distance measurement method for measuring a distance with the use of the first image and the second image, depending on the amount of movement; and a fourth process of outputting a result of calculation of a route for guiding the vehicle 1 to a parking space, on the basis of the result of distance measurement.

Figure 2:
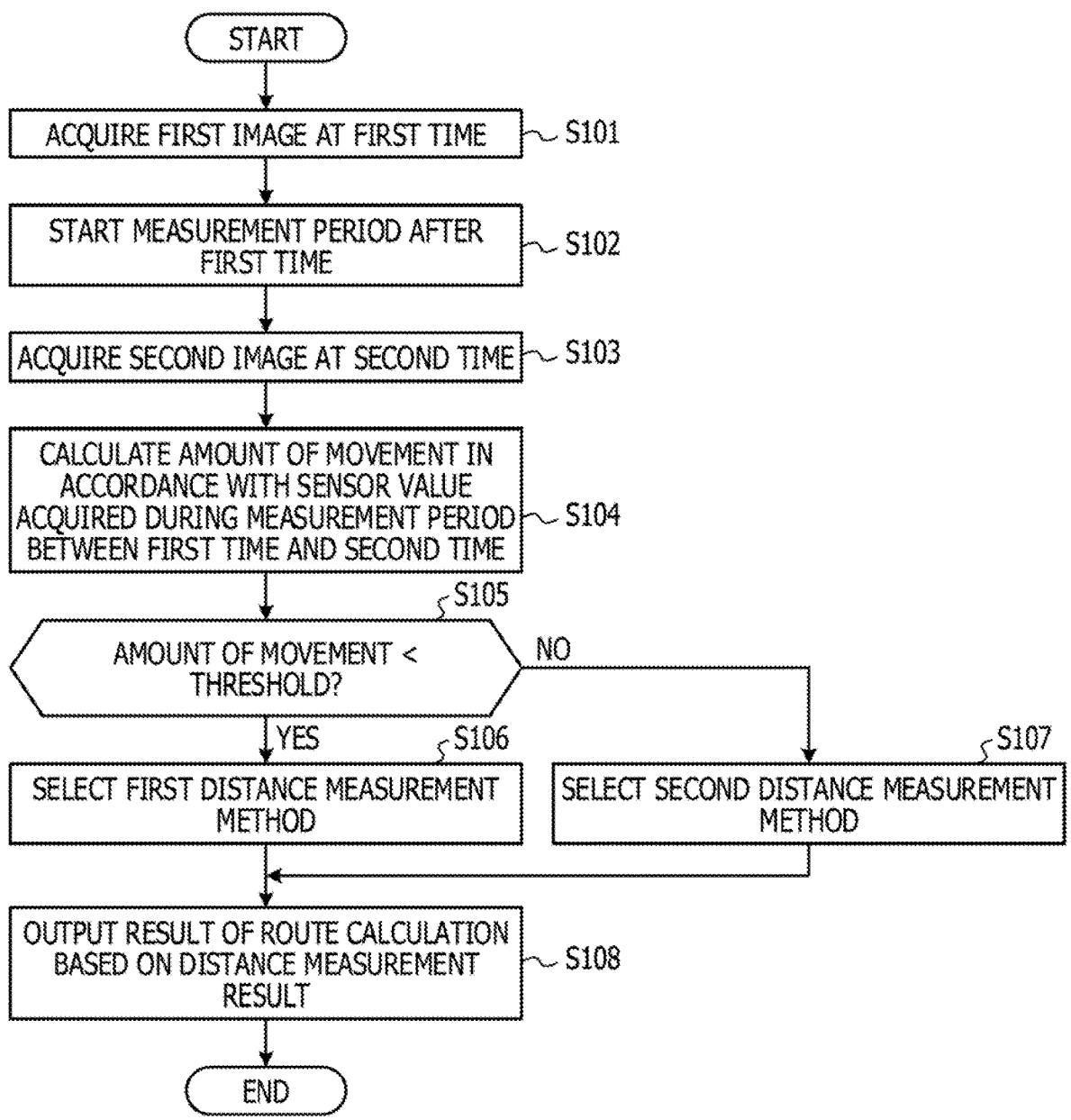
FIG. 2 is a chart illustrating an example of a process flow in the vehicle parking support device according to the first embodiment.

FIG. 2 is a chart illustrating an example of a process flow in the vehicle parking support device 10 according to the first embodiment. The process flow illustrated in FIG. 2 may start when a parking support function is activated by an operation performed by a user (who may also be referred to as a driver, a passenger, or a companion), for example.

The processing circuit 11 acquires the first image at the first time (S101). In a process S101, the processing circuit 11 may acquire the first image, which has been captured by the monocular camera 20 and been stored into the memory 12, for example, from the memory 12 at the first time. Alternatively, the processing circuit 11 may acquire the first image, which has been captured by the monocular camera 20 at the first time and been stored into the memory 12, from the memory 12 at a time later than the first time. In other words, the first time is only required to be a time related to the first image.

After the first time, the processing circuit 11 starts a measurement period during which the wheel speed pulses from the wheel speed sensor 40 are measured (S102). In a process S102, the processing circuit 11 initializes and zeroes the wheel speed pulse number, which is the value obtained by counting the wheel speed pulses input from the wheel speed sensor 40, and counts the wheel speed pulses from the wheel speed sensor 40 while the measurement period continues. By doing so, the processing circuit 11 may update the wheel speed pulse number. The wheel speed pulse number may be stored into the memory 12. Here, the wheel speed pulses or the wheel speed pulse number is an example of the sensor value.

In the process S102, the processing circuit 11 may count wheel speed pulses from a plurality of wheel speed sensors 40. For example, the vehicle 1 may include a first wheel speed sensor 40 that outputs wheel speed pulses corresponding to rotation of the right front wheel, and a second wheel speed sensor 40 that outputs wheel speed pulses corresponding to rotation of the left front wheel. The processing circuit 11 may count the wheel speed pulses of each wheel speed sensor individually. In this case, the average value of the wheel speed pulse number of the first wheel speed sensor 40 and the wheel speed pulse number of the second wheel speed sensor 40 may be used as the sensor value. Note that the number of wheel speed sensors 40 is not limited to one or two.

The processing circuit 11 acquires the second image at the second time (S103). In the process S103, the processing circuit 11 may acquire the second image, which has been captured by the monocular camera 20 and been stored into the memory 12, for example, from the memory 12 at the second time. Alternatively, the processing circuit 11 may acquire the second image, which has been captured by the monocular camera 20 at the second time and been stored into the memory 12, from the memory 12 at a time later than the second time. In other words, the second time is only required to be a time related to the second image.

In a case where the frame rate, which is a cycle in which image data is output by the monocular camera 20, is 30 fps (frame per second), for example, the time interval between the first time and the second time may be about 0.033 seconds (33 milliseconds).

The processing circuit 11 calculates the amount of movement on the basis of the wheel speed pulse number during the measurement period (S104). In the process S104, the processing circuit 11 may determine the wheel speed pulse number during the measurement period by terminating the wheel speed pulse measurement period.

In the process S104, the processing circuit 11 may calculate the amount of movement by calculating "amount of movement $d = n \times T \times np/N$" (which may also be referred to as Expression (1)), for example. Here, n represents the circumference ratio (3.14, for example), T represents the tire diameter (which may also be referred to as the outer diameter of the tire) [m], np represents the wheel speed pulse number (which may also be referred to as the measured pulse number) measured during the measurement period, and N represents the wheel speed pulse number per tire rotation (which may also be referred to as the unit pulse number). The T value (the value of the tire diameter) and the N value (the value of the unit pulse number) may be stored into the memory 12 at an appropriate time such as the time of shipment from the factory or the time of maintenance after shipment from the factory. In Expression 1 shown above, "$n \times T$" corresponds to the length of the circumference of a tire. In Expression 1 shown above, "$np/N$" corresponds to the number of rotations of the tire during the measurement period. In other words, the amount of movement d calculated according to Expression 1 corresponds to the length of the trajectory (which may also be referred to as the moving distance) generated by the tire rotations during the measurement period.

In the process S104, the processing circuit 11 may set the measured pulse number np as the amount of movement d, not using Expression 1. In this case, a process of counting wheel speed pulses (which may also be referred to as the sensor value) from the wheel speed sensor 40 during the measurement period, and determining the measured pulse number np in the process S104 corresponds to calculating the amount of movement d of the vehicle 1 on the basis of the sensor value. Note that, when the measured pulse number np is determined, the measurement period may be ended, or the measurement period may be continued.

Note that the method of calculating the amount of movement d in the process S104 is not limited to the above example. A method according to a second embodiment described later may be used, for example.

The processing circuit 11 outputs a result of route calculation based on a result of distance measurement according to a first distance measurement method for performing distance measurement using the first image acquired in the process S101 or the second image acquired in the process S103, or a second distance measurement method for performing distance measurement using both the first image and the second image, depending on the amount of movement d (S105 through S108).

For example, in the process S105, the processing circuit 11 determines whether the amount of movement d is smaller than a predetermined threshold. If the amount of movement d is smaller than the predetermined threshold (YES in S105), the processing circuit 11 selects the first distance measurement method, and outputs a result of distance measurement according to the first distance measurement method (S106). If the amount of movement d is equal to or larger than the predetermined threshold (NO in S105), on the other hand, the processing circuit 11 selects the second distance measurement method, and outputs a result of distance measurement according to the second distance measurement method (S107).

In the process S105, the determination as to whether the amount of movement d is smaller than the threshold has an aspect of determination as to whether a sufficient parallax is being secured between the first image and the second image. In other words, in a case where the amount of movement d is determined to be smaller than the threshold in the process S105, a sufficient parallax is not being secured between the first image and the second image, and a higher distance measurement accuracy can be expected with the first distance measurement method than with the second distance measurement method.

The first distance measurement method may be any method by which a distance can be measured on the basis of the first image or the second image. For example, the first distance measurement method may be a distance measurement method based on a ground contact position determination technique. According to the connection position determination technique, the distance to the ground contact position of the object extracted from an image is estimated on the basis of the correspondence relationship between the ordinate of each of the pixels constituting the single image and the distance to the ground contact position of the object.

Figure 3:
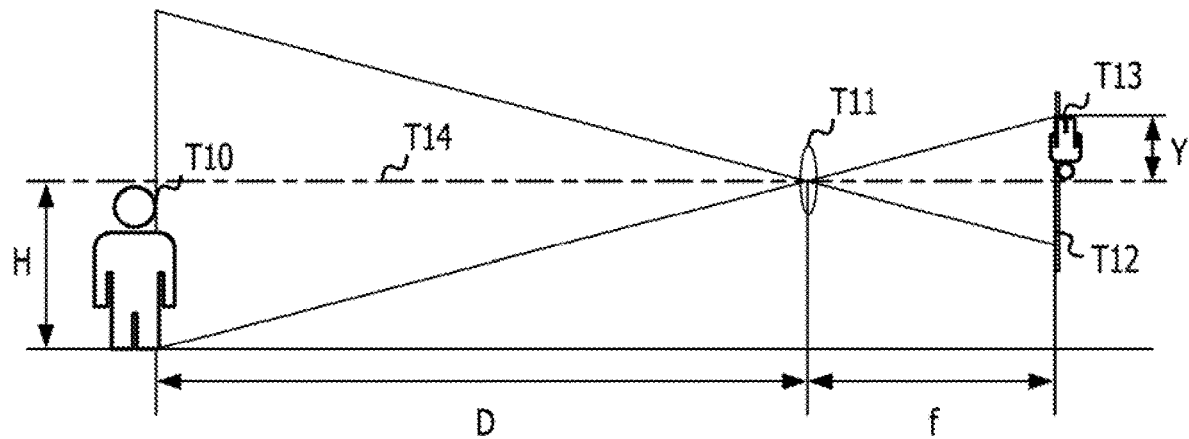
FIG. 3 is a diagram illustrating an example of distance measurement principles based on a ground contact position determination technique.

FIG. 3 is a diagram illustrating an example of distance measurement principles based on the ground contact position determination technique. FIG. 3 depicts an object T10, an optical system T11 that captures an image of the object T10, an imaging surface T12 for the optical system T11, an object image T13 formed on the imaging surface T12, and the optical axis T14 (which may also be referred to as the principal axis) of the optical system T11. Note that the object image T13 on the imaging surface T12 in FIG. 3 is depicted upside down for ease of explanation, but may differ from an actual captured image acquired from the monocular camera 20.

In FIG. 3, the object T10 and the object image T13 have the relationship represented by "H/D=Y/f" (which may also be referred to as Expression (2)). Here, the symbol H in Expression (2) represents the height from the ground contact position of the object T10 to the optical axis T14. The symbol Y in Expression (2) represents the height from the ground contact position of the object image T13 to the optical axis T14 on the imaging surface T12. The position of the optical axis T14 on the imaging surface T12 corresponds to the coordinates near the center on the imaging surface T12.

The symbol D in Expression (2) represents the distance from the ground contact position of the object T10 to the optical system T11. The symbol f in Expression (2) represents the distance from the ground contact position of the object image T13 on the imaging surface T12 to the optical system T11.

Expression (2) can be converted into an equation for calculating the distance D to the object T10. In other words, in a process according to the first distance measurement method, the processing circuit 11 calculates "D=H×f/Y" (which may also be referred to as Expression (3)), to output a distance measurement result corresponding to the distance D to the object T10. Alternatively, a conversion table corresponding to a result of calculation according to Expression (3) in a case where the height Y is changed in multiple stages is stored in the memory 12, and an approximate value of the distance D may be acquired from the conversion table on the basis of the height Y obtained during operation.

In Expression (3), the distance f is a design value corresponding to the structure of the monocular camera 20, and is stored into the memory 12 at any appropriate timing such as the time of shipment from the factory or the time of maintenance after the shipment from the factory.

If the road surface from the object T10 to the optical system T11 is flat, the height H corresponds to the height of the installation position of the optical system T11. In other words, in Expression (3), the height H is a design value corresponding to the height of the installation position of the monocular camera 20 mounted on the vehicle 1 from the road surface, and may be stored into the memory 12 at any appropriate timing such as the time of shipment from the factory or the time of maintenance after the shipment from the factory.

In Expression (3), the height Y is the value calculated in accordance with the ground contact position of the object image T13 detected from an image captured by the monocular camera 20 (this image may also be referred to as the captured image). For example, the height Y may be obtained through calculation of the difference between the Y-coordinate value of the ground contact position of the object image T13 and half the value of the image dimension of the captured image in the Y-axis direction (which may also be referred to as the height direction). To determine the ground contact position of the object image T13, edge line segments having the characteristics of the object are extracted from the captured image on the basis of a predetermined algorithm, and the Y-coordinate value of the lowermost edge line segment is retrieved from among the extracted edge line segments. For example, an edge image having a plurality of edge line segments is generated by using various kinds of filters such as a Sobel filter and a Laplacian filter for the captured image. Note that the captured image used in the first distance measurement method may be either the first image or the second image.

As can be understood from the expression (3), in the first distance measurement method, if the accuracy of detection of the ground contact position of the object image T13 deteriorates, the distance measurement result also deteriorates. For this reason, if two or more images with a sufficient parallax can be acquired, an increase in distance measurement accuracy can be expected with the use of a distance measurement result obtained by the second distance measurement method. In view of this, in a case where the processing circuit 11 in the process S105 determines that the amount of movement d is equal to or larger than the predetermined threshold (NO in S105), the processing circuit 11 selects the second distance measurement method (S107). As described above, in a case where the amount of movement d is determined to be equal to or larger than the predetermined threshold in the process S105, a sufficient parallax is being secured between the first image and the second image, and a higher distance measurement accuracy can be expected with the second distance measurement method than with the first distance measurement method.

In the process S107, the second distance measurement method is a distance measurement method for performing distance measurement using both the first image and the second image, and may be a distance measurement method for estimating the three-dimensional position of the object on the basis of the parallax between the two images. For example, the second distance measurement method may be a distance measurement method using a moving stereo technique. By the moving stereo technique, the distance to the object is estimated on the basis of the movement of the object on the screen and the amount of displacement of the image capturing position (which may also be referred to as the camera position), the object appearing in a plurality of images captured at minute time intervals. For example, in a case where the frame rate of images captured by the monocular camera 20 is 30 frames per second, the processing circuit 11 may perform distance measurement by the moving stereo technique, on the basis of the first image and the second image selected from a plurality of images captured at intervals of about 33 milliseconds. As the amount of displacement of the camera position, the amount of movement d calculated in the process S104 may be used, for example. Alternatively, an amount of movement d based on a result of positioning conducted by a satellite positioning system such as a global positioning system (GPS) may be used.

In the process S107, the first image and the second image may be updated (acquired) at any appropriate intervals. For example, the first image may be updated every first number of frames (for example, 30 frames), and the second image may be updated every second number of frames (for example, one frame). In other words, in the process S107, the first image is acquired every 30 frames, and the first image may not be updated before 30 frames have passed since the acquisition of the first image. In this case, in the process flow illustrated in FIG. 2, the processes S101 and S102 may be repeatedly carried out every time the first number of frames have passed, and the processes S103 through S108 may be repeatedly carried out every time the second number of frames have passed.

In the process S108, on the basis of a result of distance measurement conducted by the first distance measurement method or the second distance measurement method, the processing circuit 11 performs a route calculation process according to a predetermined route calculation algorithm for guiding the vehicle 1 to a parking space, to output a route calculation result. For example, the processing circuit 11 may visually support the user (who may also be referred to as the driver) operating the vehicle, by displaying an optimum route based on the route calculation result on the screen of the user interface device 30. Alternatively, the processing circuit 11 may supply the route calculation result based on the distance measurement result to an electronic control unit (which may also be referred to as the drive control ECU) that controls driving of the vehicle 1, to reflect the distance measurement result in an automatic parking process being performed by the drive control ECU. International Publication Pamphlet No. WO 2010/098170 (U.S. Pat. No. 8,816,878) specifically discloses a conventional technology for guiding a vehicle to a desired parking target position by automatic steering.

As described above, in a case where the distance to the object is measured on the basis of an image captured with the monocular camera 20 mounted on the vehicle 1, the optimum distance measurement method can be selected in accordance with the amount of movement of the vehicle 1, and thus, distance measurement accuracy can be increased.

Second Embodiment

In the above configuration, an amount of movement is not necessarily the length of the trajectory (which may also be referred to as the moving distance) generated by tire rotations during a measurement period. In a vehicle parking support device 10 according to a second embodiment, the concept of an amount of turning (which may also be referred to as the turning angle) corresponding to displacement caused in the optical axis of the monocular camera 20 by movement of the vehicle 1 is introduced as an example amount of movement. Prior to explanation of the vehicle parking support device 10 according to the second embodiment, the motive for introducing the concept of an amount of turning is described below.

Figure 4:
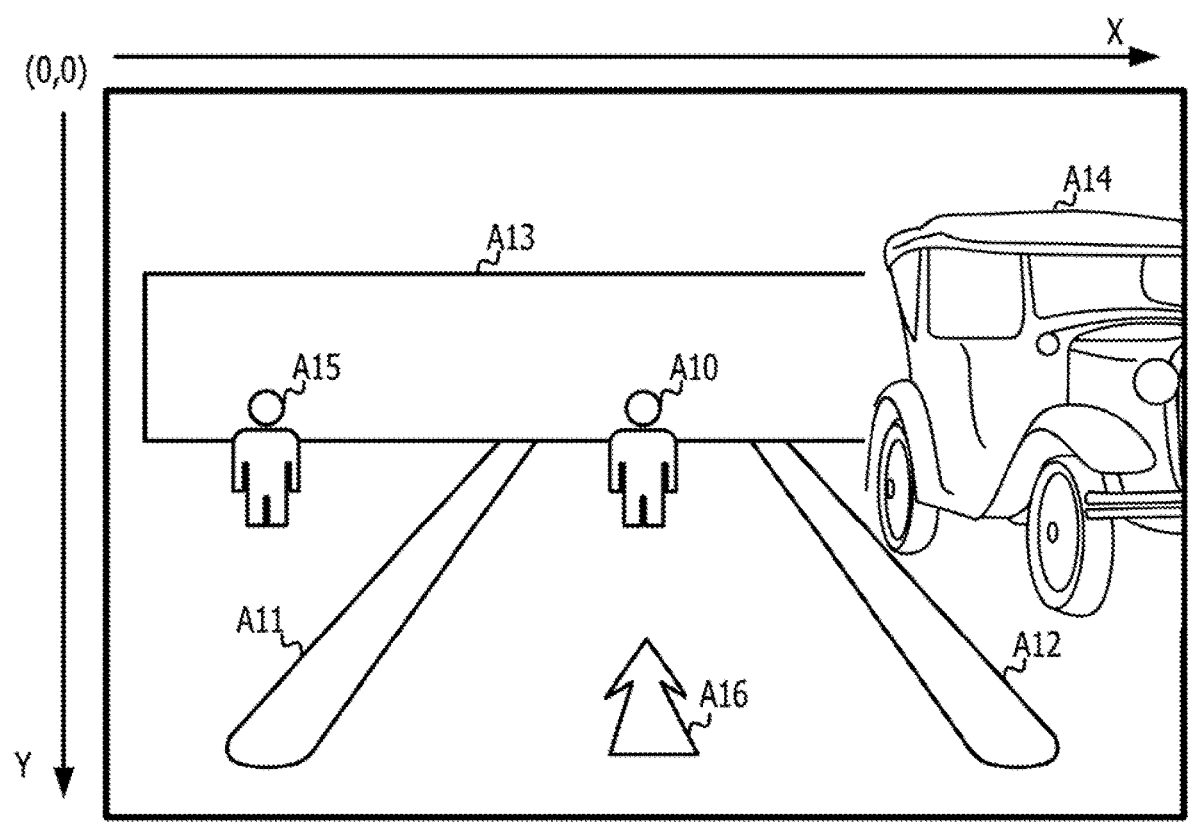
FIG. 4 is a diagram illustrating an example image captured by a monocular camera mounted on the vehicle.

FIG. 4 is a diagram illustrating an example image captured by the monocular camera 20 mounted on the vehicle 1. FIG. 4 depicts a first pedestrian A10, white lines A11 and A12 that are drawn on the road surface and indicate the frame of a parking space, a wall A13, a vehicle A14 parked in an adjacent parking space, a second pedestrian A15, and an arrow A16 indicating the moving direction of the vehicle 1. Note that the arrow A16 may not actually appear in the captured image.

In FIG. 4, while the second pedestrian A15 stands at a position away from the center of the image, the first pedestrian A10 stands near the center of the image, and the position of the first pedestrian A10 substantially coincides with the optical axis of the monocular camera 20. In a case where the vehicle 1 moves in the direction indicated by the arrow A16, the first pedestrian A10 continues to stand near the optical axis of the monocular camera 20 at minute time intervals. Note that, in this example, the direction indicated by the arrow A16 has an aspect as the optical axis direction of the monocular camera 20 mounted on the vehicle 1.

In a case where the vehicle 1 moves in the optical axis direction of the monocular camera 20 (which is the direction indicated by the arrow A16), even if the moving distance is equal to or longer than the threshold mentioned above, a sufficient parallax cannot be obtained around the optical axis, and the distance measurement accuracy by the moving stereo technique with respect to the first pedestrian A10 standing in the vicinity of the optical axis might drop.

In view of this, the second embodiment introduces the concept of an amount of turning as the amount of movement serving as the criterion in selecting a distance measurement method, to prevent the decrease in distance measurement accuracy.

Figure 5:
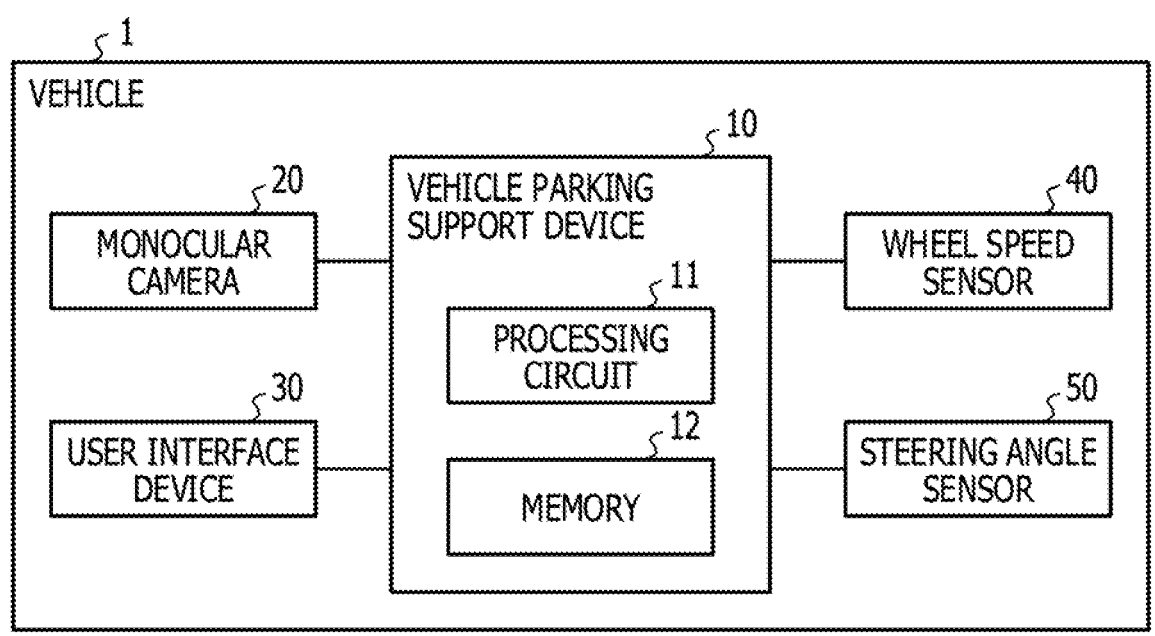
FIG. 5 is a diagram illustrating an example outline of the configuration of a vehicle that includes a vehicle parking support device according to a second embodiment.

FIG. 5 is a diagram illustrating an example outline of the configuration of a vehicle 1 that includes the vehicle parking support device 10 according to the second embodiment. The configuration of the vehicle 1 illustrated in FIG. 5 differs from the configuration of the first embodiment illustrated in FIG. 1 in that a steering angle sensor 50 is added, but is the same in other aspects.

The steering angle sensor 50 is a sensor designed to output the sensor value corresponding to the front wheel turning angle (which may also be referred to as the steering angle) with respect to the frontward direction of the vehicle 1. For example, the steering angle sensor 50 may be designed to detect the amount of rotation of the steering shaft of the vehicle 1, and output the sensor value corresponding to the amount of rotation of the steering shaft.

The processing circuit 11 is designed to acquire the front wheel turning angle with respect to the frontward direction of the vehicle 1, on the basis of the sensor value supplied from the steering angle sensor 50. In other words, the front wheel turning angle corresponds to the angle of the traveling direction of the vehicle 1 with respect to the frontward direction.

Figure 6:
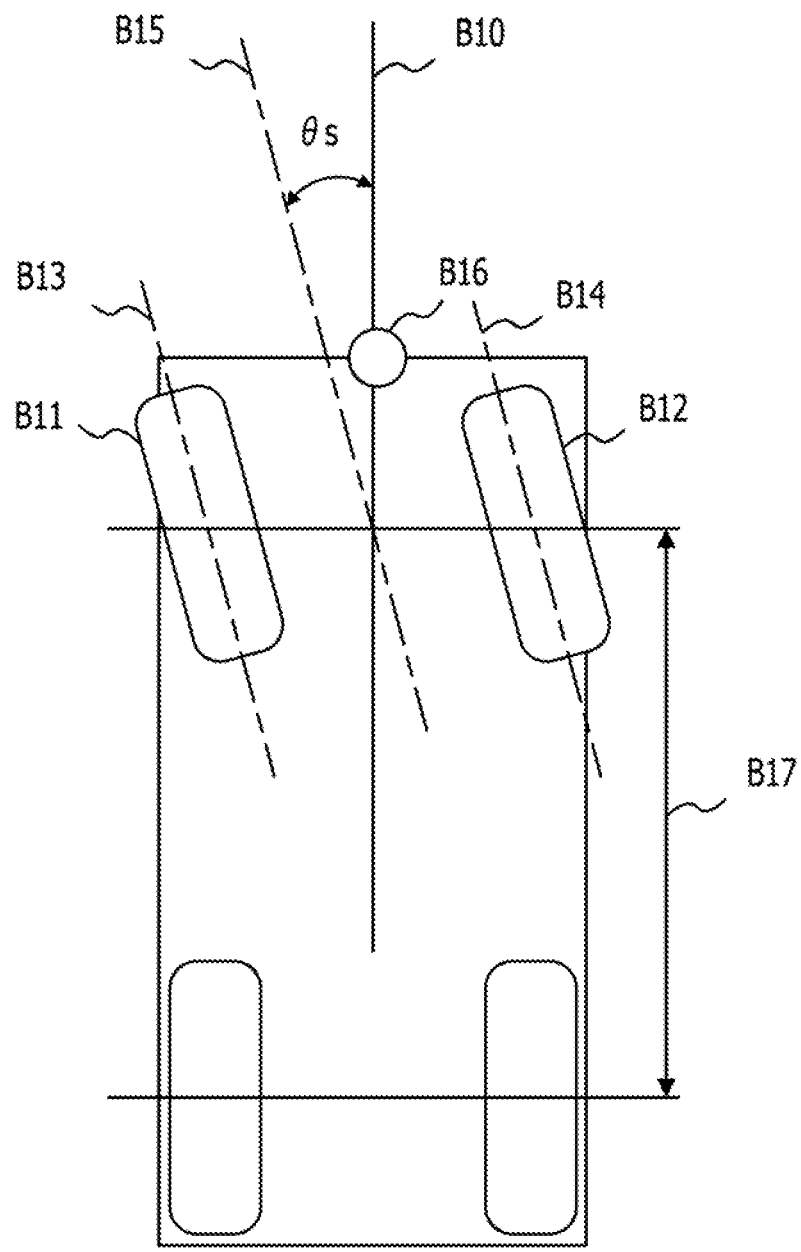
FIG. 6 is a diagram illustrating an example of a front wheel turning angle of the vehicle.

FIG. 6 is a diagram illustrating an example of the front wheel turning angle of the vehicle 1. The vehicle 1 illustrated in FIG. 6 has a total of four tires, which are front wheels and rear wheels, and a monocular camera B16 is mounted on the front of the vehicle 1. The mounting position of the monocular camera B16 may be a rear portion of the vehicle 1. The separation distance between the front wheels and the rear wheels is indicated by a wheelbase B17.

In FIG. 6, the left front wheel B11 and the right front wheel B12 of the vehicle 1 have a turning angle of approximately $\theta s$ [rad] with respect to the frontward direction B10 of the vehicle 1. In other words, a line segment B13 indicating the direction of the left front wheel B11, a line segment B14 indicating the direction of the right front wheel B12, and a line segment B15 indicating the traveling direction of the vehicle 1 are substantially parallel. The frontward direction B10 of the vehicle 1 may also be referred to as the central axis of the vehicle 1. The line segment B13 indicating the traveling direction of the left front wheel B11 may also be referred to as the central axis of the left front wheel B11. The line segment B14 indicating the direction of the right front wheel B12 may also be referred to as the central axis of the right front wheel B12.

In FIG. 6, the angle of the line segment B13 indicating the direction of the left front wheel B11, which is an inner wheel, with respect to the frontward direction B10 of the vehicle 1 may be larger than the angle of the line segment B14 indicating the direction of the right front wheel B12, which is an outer wheel, with respect to the frontward direction B10 of the vehicle 1. In this case, the processing circuit 11 may use the average value of the turning angle of the left front wheel B11 and the turning angle of the right front wheel B12 as the steering angle.

Figure 7:
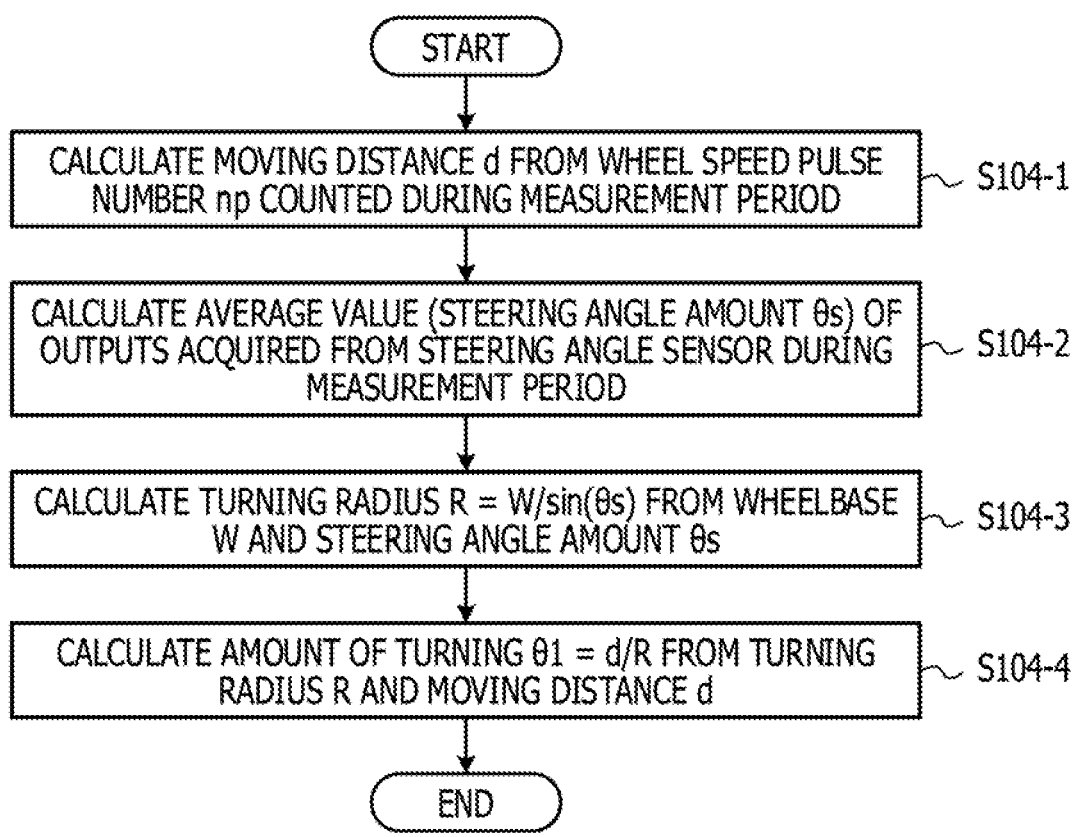
FIG. 7 is a chart illustrating an example of a process flow in the vehicle parking support device according to the second embodiment.

FIG. 7 is a diagram illustrating an example of a process flow in the vehicle parking support device according to the second embodiment. FIG. 7 shows the specific process corresponding to the process S104 in the process flow of the first embodiment illustrated in FIG. 2. In other words, in the flow of the process in the vehicle parking support device 10 according to the second embodiment, the processes S101 through S103, and the processes S105 through S108 illustrated as an example in FIG. 2 are the same as those of the first embodiment.

From the wheel speed pulse number np counted during the measurement period, the processing circuit 11 calculates the moving distance d [m] by the same technique as that used in the first embodiment (S104-1).

The processing circuit 11 acquires a steering angle amount $\theta s$, on the basis of the sensor values acquired from the steering angle sensor 50 during the measurement period (S104-2). In the process S104-2, the processing circuit 11 may acquire the steering angle amount $\theta s$ by calculating the average value of the sensor values supplied from the steering angle sensor 50, for example. Note that the method for acquiring the steering angle amount $\theta s$ is not limited to this, and some other known means may be used.

The processing circuit 11 calculates the turning radius R of the vehicle 1, from the wheelbase W of the vehicle 1 and the steering angle amount $\theta s$ (S104-3). In the process S104-3, the processing circuit 11 may acquire the turning radius R [m] by calculating "R=W/sin ($\theta s$)" (which may also be referred to as Expression (4)), for example. In Expression (4), the symbol W represents the wheelbase W [m] of the vehicle 1, and the symbol $\theta s$ represents the steering angle amount $\theta s$ [rad]. Note that, in a case where the steering angle amount $\theta s$ is a minute angle amount such as $\theta s$<0.5 [rad], for example, the sine function sin ($\theta s$) can be approximated by the steering angle amount $\theta s$. In this case, Expression (4) can be modified as follows. That is, "R=W/$\theta s$" (which may also be referred to as Expression (4')).

The processing circuit 11 calculates an amount of turning $\theta 1$ [rad], from the turning radius R [m] calculated in the process S104-3 and the moving distance d [m] calculated in the process S104-1 (process S104-4). In the process S104-4, the processing circuit 11 may acquire the amount of turning $\theta 1$ by calculating "$\theta 1$=d/R" (which may also be referred to as Expression (5)), for example. In Expression (5), the symbol d represents the moving distance d [m], and the symbol R represents the turning radius R [m].

Figure 8:
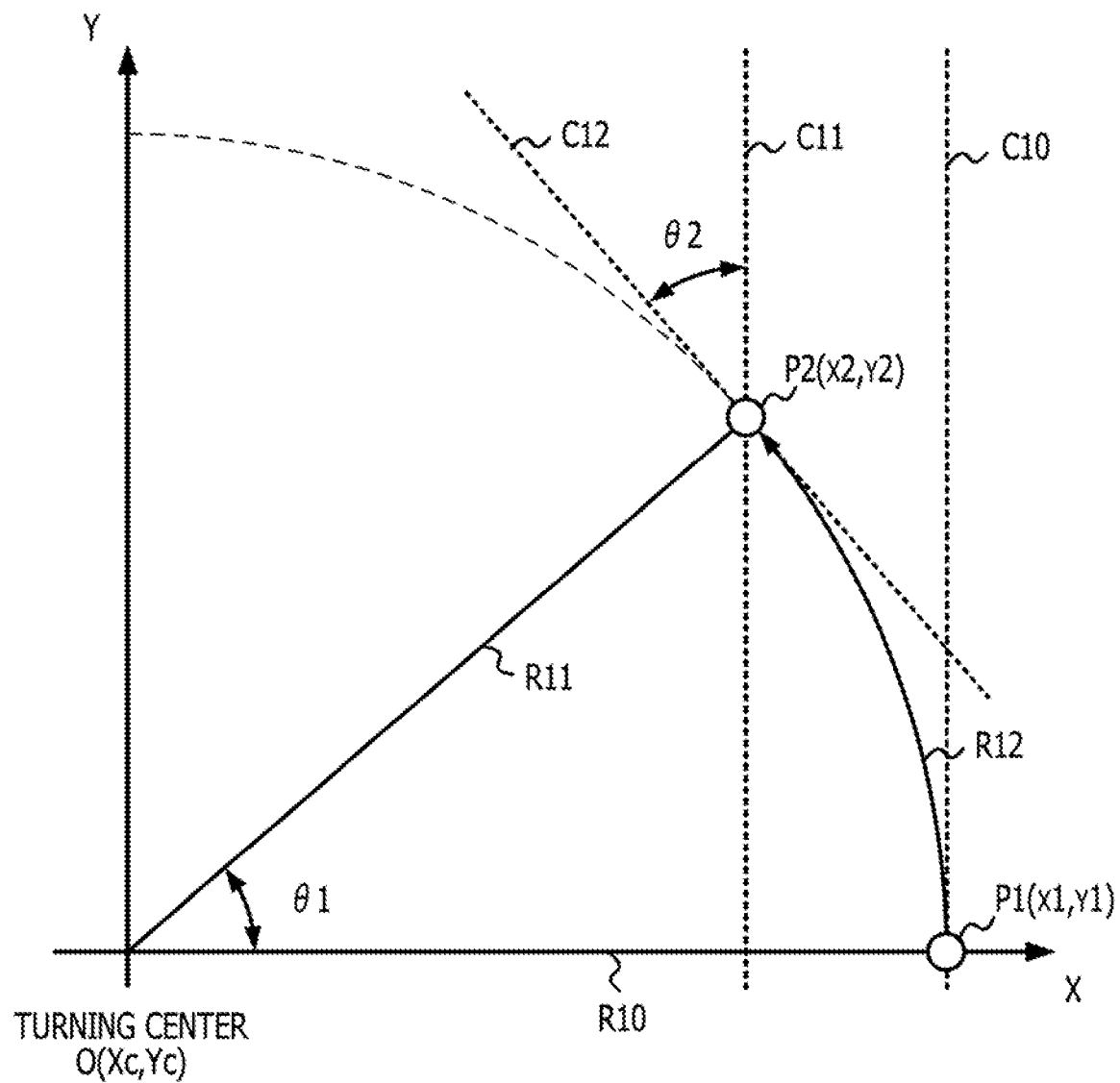
FIG. 8 is a diagram showing an example of a movement trajectory and a turning radius of the vehicle.

FIG. 8 is a diagram showing an example of a movement trajectory and a turning radius of the vehicle 1. As illustrated in FIG. 8, when the vehicle 1 turns with a turning radius R10, the monocular camera 20 mounted on the vehicle 1 moves from a point P1 (X1, Y1) to a point P2 (X2, Y2) along a movement trajectory R12. In FIG. 8, the turning radius R10, which is the distance between the point P1 (X1, Y1) before the movement and the turning center O (Xc, Yc), and a line segment R11 indicating the distance between the point P2 (X2, Y2) after the movement and the turning center O (Xc, Yc) have the same length.

In FIG. 8, when the monocular camera 20 is located at the point P1, the optical axis of the monocular camera 20 is parallel to the Y-axis direction, and extends in the direction of a line segment C10 passing through the point P1. When the monocular camera 20 is located at the point P2, the optical axis of the monocular camera 20 is in the direction of a line segment C12 extending in the tangential direction of the arc of the turning radius R11. The angle $\theta 2$ between a line segment C11 that is parallel to the line segment C10 and passes through the point P2, and the line segment C12 is the same as the angle $\theta 1$ (which may also be referred to as the turning angle or the amount of turning) between a line segment R10 connecting the point P1 and the turning center O, and the line segment R11 connecting the point P2 and the turning center O. In other words, when the vehicle 1 turns from the point P1 to the point P2, the optical axis of the monocular camera 20 at the point P2 is shifted by the same angle $\theta 2$ as the turning angle $\theta 1$ with respect to the optical axis at the point P1.

Accordingly, the turning angle $\theta 1$ (which may also be referred to as the amount of turning) of the vehicle 1 can be used as the criterion for determining whether a sufficient parallax is being secured between the first image acquired at the time when the monocular camera 20 was located at the point P1, and the second image acquired at the time when the monocular camera 20 was located at the point P2.

In the process flow according to the second embodiment, the amount of turning $\theta 1$ calculated in the process S104-4 is used as the amount of movement in the process S105 illustrated in FIG. 2. In other words, the amount of turning $\theta 1$ (which may also be referred to as the amount of movement) calculated in the process S104-4 is compared with the predetermined threshold (S105). If the amount of turning $\theta 1$ is smaller than the threshold (YES in S105), the processing circuit 11 may select the first distance measurement method (S106). In other words, in the process S106, the processing circuit 11 may output (acquire) a result of distance measurement conducted by the first distance measurement method. If the amount of turning θ1 (which may also be referred to as the amount of movement) is equal to or larger than the threshold (NO in S105), on the other hand, the processing circuit 11 may select the second distance measurement method (S107). In other words, in the process S107, the processing circuit 11 may output (acquire) a result of distance measurement conducted by the second distance measurement method. After that, in the process S108, on the basis of a result of distance measurement conducted by the first distance measurement method or the second distance measurement method, the processing circuit 11 performs a route calculation process according to a predetermined route calculation algorithm for guiding the vehicle 1 to a parking space, to output a route calculation result.

As described above, in a case where the distance to the object is measured on the basis of an image captured with the monocular camera 20 mounted on the vehicle 1, the optimum distance measurement method can be selected in accordance with the amount of movement (the turning angle) of the vehicle 1, and thus, distance measurement accuracy can be increased. Particularly, it is possible to prevent a decrease in accuracy due to movement in the optical axis direction in the second distance measurement method, which is difficult to control in a case where only a moving distance is used as the determination criterion. In other words, in the case of movement approximately in the optical axis direction, the first distance measurement method is selected through determination based on the amount of turning θ1. Such an action is advantageous in improving the accuracy of measurement of the distance from a moving body to the object on the basis of an image captured by the monocular camera 20.

Third Embodiment

A third embodiment proposes a process flow in which the process according to the first embodiment and the process according to the second embodiment are combined. The configuration of a vehicle 1 including a vehicle parking support device 10 according to the third embodiment is the same as the configuration illustrated in FIG. 5.

Figure 9:
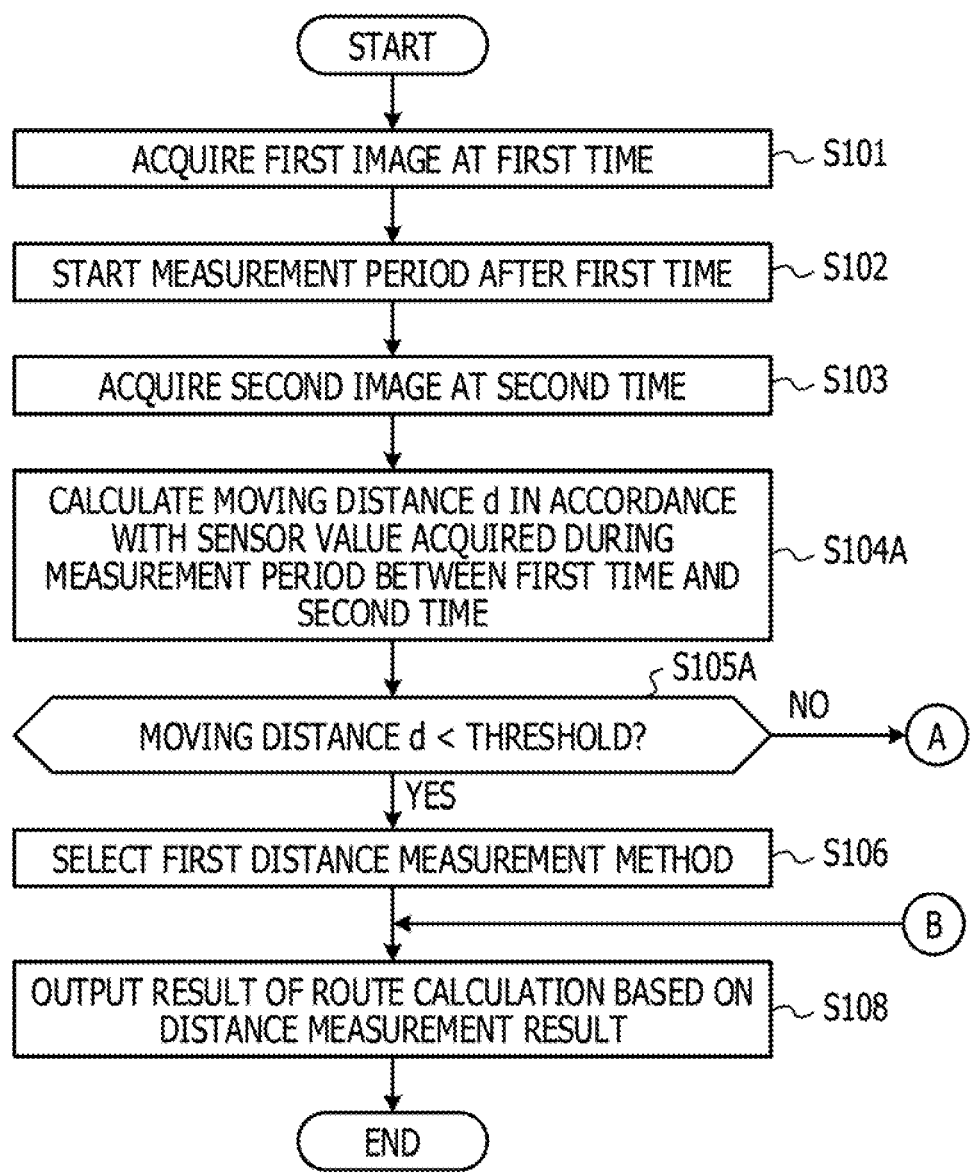
FIG. 9 is a chart (first chart) illustrating an example of a process flow in a vehicle parking support device according to a third embodiment.
Figure 10:
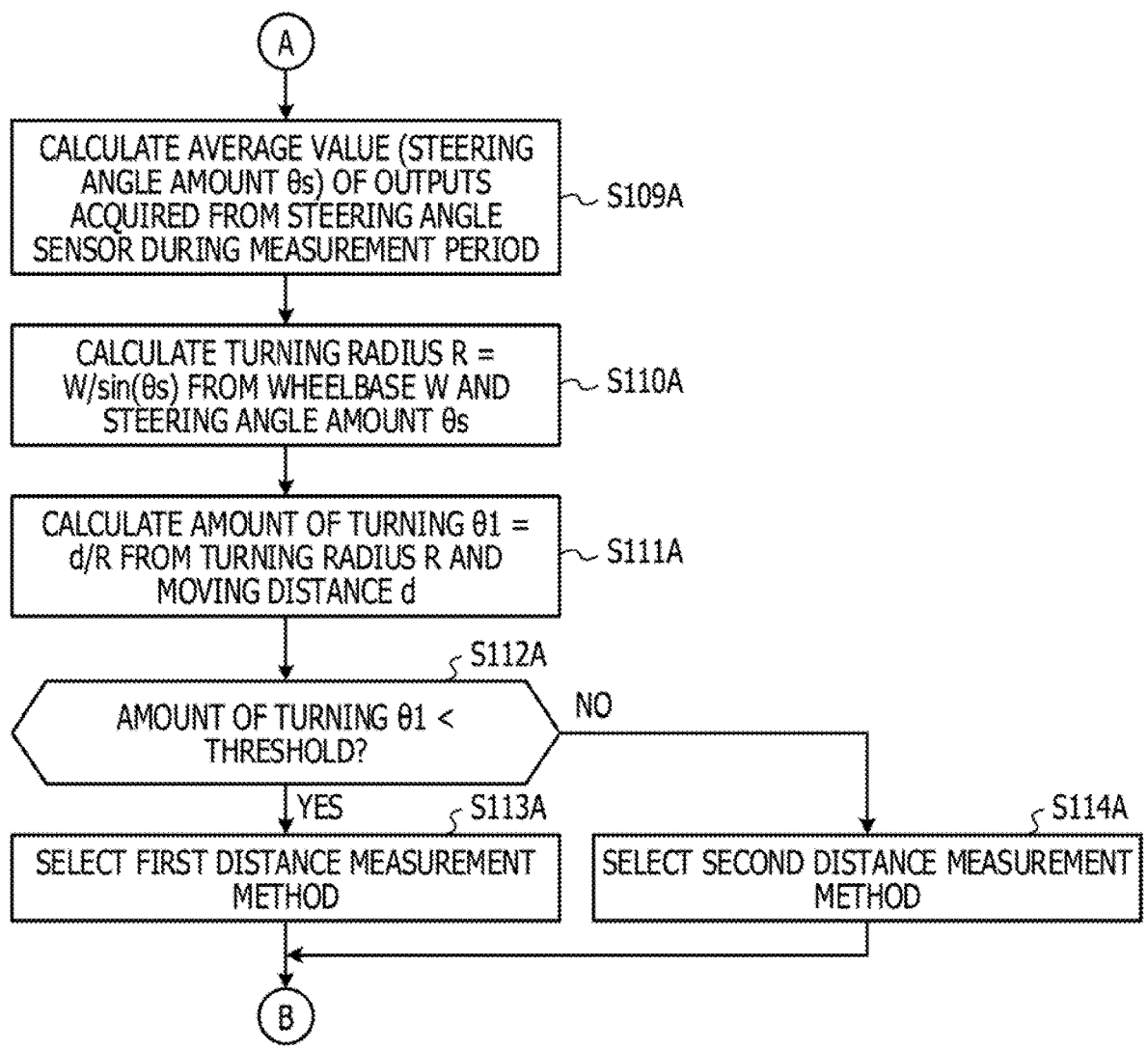
FIG. 10 is a chart (second chart) illustrating an example of a process flow in the vehicle parking support device according to the third embodiment.

FIGS. 9 and 10 are charts illustrating an example of a process flow in the vehicle parking support device 10 according to the third embodiment. In the process flow according to the third embodiment illustrated in FIG. 9, the technical idea for performing two-stage determination consisting of first determination (a process S105A in FIG. 9) based on a moving distance, and second determination (a process S112A in FIG. 10) based on an amount of turning is introduced in place of the determination (the process S105 in FIG. 2) based on an amount of movement.

In the example illustrated in FIG. 9, processes S101 through S103 are the same as those in the example illustrated in FIG. 2. Further, in a process S104A, a moving distance d is used as the amount of movement to be calculated on the basis of sensor values. However, the process S104A is substantially the same as the process S104 described in the first embodiment.

If the moving distance d is determined to be shorter than a predetermined threshold (which may also be referred to as the first threshold) in the process S105A (YES in S105A), the processing circuit 11 selects the first distance measurement method, and outputs a result of distance measurement conducted by the first distance measurement method (S106), as in the first embodiment. If the moving distance d is determined to be equal to or longer than the predetermined threshold (which may also be referred to as the first threshold) in the process S105A (NO in S105A), on the other hand, the processing circuit 11 does not immediately selects the second distance measurement method, but performs second determination based on an amount of turning (S109A through S112A).

In the process S109A, the processing circuit 11 calculates the average value (which may also be referred to as the steering angle amount θs) of sensor values acquired from the steering angle sensor 50 during the measurement period, as in the process S104-2 of the second embodiment.

In the process S110A, the processing circuit 11 calculates the turning radius R of the vehicle 1, from the wheelbase W of the vehicle 1 and the steering angle amount θs, as in the process S104-3 of the second embodiment. In other words, the processing circuit 11 may acquire the turning radius R [m] by calculating "R=W/sin (θs)" (which may also be referred to as Expression (4)), for example. In Expression (4), the symbol W represents the wheelbase W [m] of the vehicle 1, and the symbol θs represents the steering angle amount θs [rad]. Note that, in a case where the steering angle amount θs is a minute angle amount such as θs<0.5 [rad], for example, the sine function sin (θs) can be approximated by the steering angle amount θs. In this case, Expression (4) can be modified as follows. That is, "R=W/θs" (which may also be referred to as Expression (4').

In the process S111A, the processing circuit 11 calculates an amount of turning θ1 [rad], from the turning radius R [m] calculated in the process S110A and the moving distance d [m] calculated in the process S104A, as in the process S104-4 of the second embodiment. In the process S111A, the processing circuit 11 may acquire the amount of turning θ1 by calculating "θ1=d/R" (which may also be referred to as Expression (5)), for example. In Expression (5), the symbol d represents the moving distance d [m], and the symbol R represents the turning radius R [m].

In a process S112A, the processing circuit 11 determines whether the amount of turning θ1 is smaller than a predetermined threshold (which may also be referred to as the second threshold) (this determination may also be referred to as the second determination). If the amount of turning θ1 is smaller than the second threshold (YES in S112A), the processing circuit 11 selects the first distance measurement method, and outputs a result of distance measurement conducted by the first distance measurement method (S113A). If the amount of turning θ1 is equal to or larger than the second threshold (NO in S112A), on the other hand, the processing circuit 11 selects the second distance measurement method, and outputs a result of distance measurement conducted by the second distance measurement method (S114A).

After that, on the basis of a result of distance measurement conducted by the first distance measurement method or the second distance measurement method, the processing circuit 11 performs a route calculation process according to a predetermined route calculation algorithm for guiding the vehicle 1 to a parking space, to output a route calculation result (S108), as in the first embodiment.

As described above, in a case where the distance to the object is measured on the basis of an image captured with the monocular camera 20 mounted on the vehicle 1, the optimum distance measurement method can be selected in accordance with the amount of movement of the vehicle 1, and thus, distance measurement accuracy can be increased. Particularly, it is possible to increase the accuracy of measurement of the distance from a moving body to the object more efficiently than in a case where control is performed with only a moving distance or an amount of turning as the determination criterion.

In the example illustrated in FIGS. 9 and 10, the second determination based on the amount of turning θ1 is not performed in a case where the moving distance d is shorter than the first threshold. Accordingly, the process of calculating the amount of turning θ1 can be omitted, and only the first determination based on the moving distance d that can be measured through a simpler process is required. This contributes to a reduction of calculation costs.

Further, in the example illustrated in FIGS. 9 and 10, when the moving distance d is equal to or longer than the first threshold, the second determination based on the amount of turning θ1 is performed. Thus, the accuracy decrease to be caused by the second distance measurement method due to movement in the optical axis direction can be prevented. In other words, in a case where the moving distance d equal to or longer than the first threshold is movement substantially in the optical axis direction, the first distance measurement method is selected through the second determination based on the amount of turning θ1. Thus, selection of the second distance measurement method in a case where images with a sufficient parallax has not been obtained can be prevented, and the distance measurement accuracy of the vehicle parking support device 10 can be increased.

Fourth Embodiment

In a vehicle parking support device 10 according to a fourth embodiment, a technical idea is introduced to divide an image captured by the monocular camera 20 into a plurality of regions, and vary the control of distance measurement method selection for each region. Prior to explanation of the vehicle parking support device 10 according to the fourth embodiment, the motive for introducing the above technical idea according to the fourth embodiment is first described.

Figure 11:
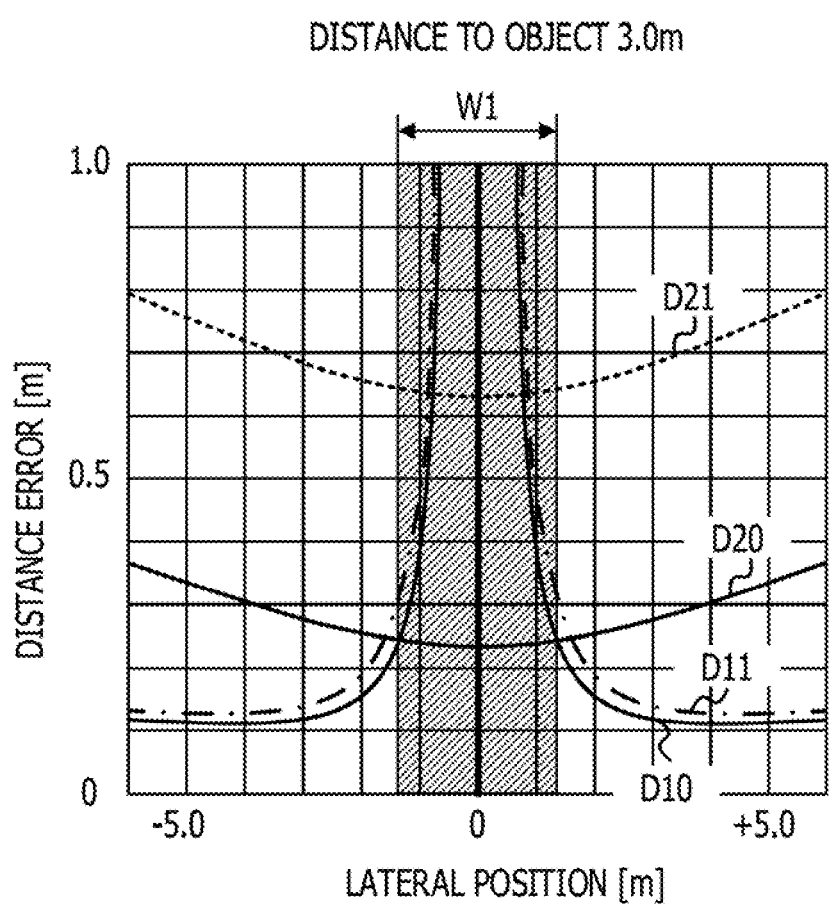
FIG. 11 is a chart (first chart) illustrating the characteristics of the first distance measurement method and the second distance measurement method.

FIG. 11 is a chart illustrating an example of characteristics of a first distance measurement method (which may also be referred to as the ground contact position determination technique) and a second distance measurement method (which may also be referred to as the moving stereo technique) in a case where the distance to the object is 3.0 [m]. In the characteristics chart in FIG. 11, the abscissa axis indicates lateral position [m], and the ordinate axis indicates distance error [m].

At a lateral position [m] indicated by the abscissa axis, the optical axis of the monocular camera 20 is the center (0 [m]), displacement from the optical axis to the right is indicated by a positive value, and displacement from the optical axis to the left is indicated by a negative value.

As for the distance error [m] indicated by the ordinate axis, a range from 0 [m] to 1.0 [m] is shown as the range of error that may occur in a result of distance measurement conducted by each distance measurement method.

In FIG. 11, a solid line D10 indicates the characteristics of the second distance measurement method measured under the condition that the distance to the object is 3.0 [m] (the characteristics may also be referred to as the characteristics D10), and a dot-and-dash line D11 indicates the characteristics of the second distance measurement method measured while the detection position of the object in a captured image is shifted by an amount equivalent to one pixel (the characteristics may also be referred to as the characteristics D11). As illustrated in FIG. 11, by the second distance measurement method, a relatively stable distance measurement accuracy is achieved in regions away from the optical axis, even though an error of about one pixel occurs in the detection position in the captured image. In the vicinity of the optical axis, however, the distance error (which may also be referred to as the distance measurement error) caused by the second distance measurement method increases exponentially, and the measurement accuracy deteriorates.

In FIG. 11, a solid line D20 indicates the characteristics of the first distance measurement method measured under the condition that the distance to the object is 3.0 [m] (the characteristics may also be referred to as the characteristics D20), and a dashed line D21 indicates the characteristics of the first distance measurement method measured while the detection position of the object in a captured image is shifted by an amount equivalent to one pixel (the characteristics may also be referred to as the characteristics D21). As illustrated in FIG. 11, the first distance measurement method is affected by a detection position error in a captured image more greatly than the second distance measurement method. In other words, the difference between the characteristics D20 and the characteristics D21 of the first distance measurement method is larger than the difference between the characteristics D10 and the characteristics D11 of the second distance measurement method. Meanwhile, by the first distance measurement method, the distance error becomes smaller as the lateral position becomes closer to the optical axis. The distance error is the smallest on the optical axis. In other words, by the first distance measurement method, the distance measurement accuracy becomes higher as the lateral position becomes closer to the optical axis. The distance measurement accuracy is the highest on the optical axis.

In FIG. 11, a comparison between the characteristics D20 of the first distance measurement method and the characteristics D10 of the second distance measurement method shows that, while the lateral position is within a range W1 of about +1.5 [m], the characteristics D20 of the first distance measurement method have a smaller distance error than the characteristics D10 of the second distance measurement method. While the displacement from the optical axis is outside the range W1, on the other hand, the characteristics D10 of the second distance measurement method have a smaller distance error than the characteristics D20 of the first distance measurement method.

Accordingly, it becomes apparent from the characteristics illustrated in FIG. 11 that, within the range W1 in which displacement from the optical axis of the monocular camera 20 in a horizontal plane is smaller than a predetermined threshold, it is possible to prevent a decrease in distance measurement accuracy by selecting the first distance measurement method, regardless of the amount of movement.

Further, it also becomes apparent that, within a range in which displacement from the optical axis of the monocular camera 20 in a horizontal plane is equal to or greater than the predetermined threshold, it is possible to increase distance measurement accuracy by appropriately selecting the first distance measurement method or the second distance measurement method, depending on the amount of movement.

Figure 12:
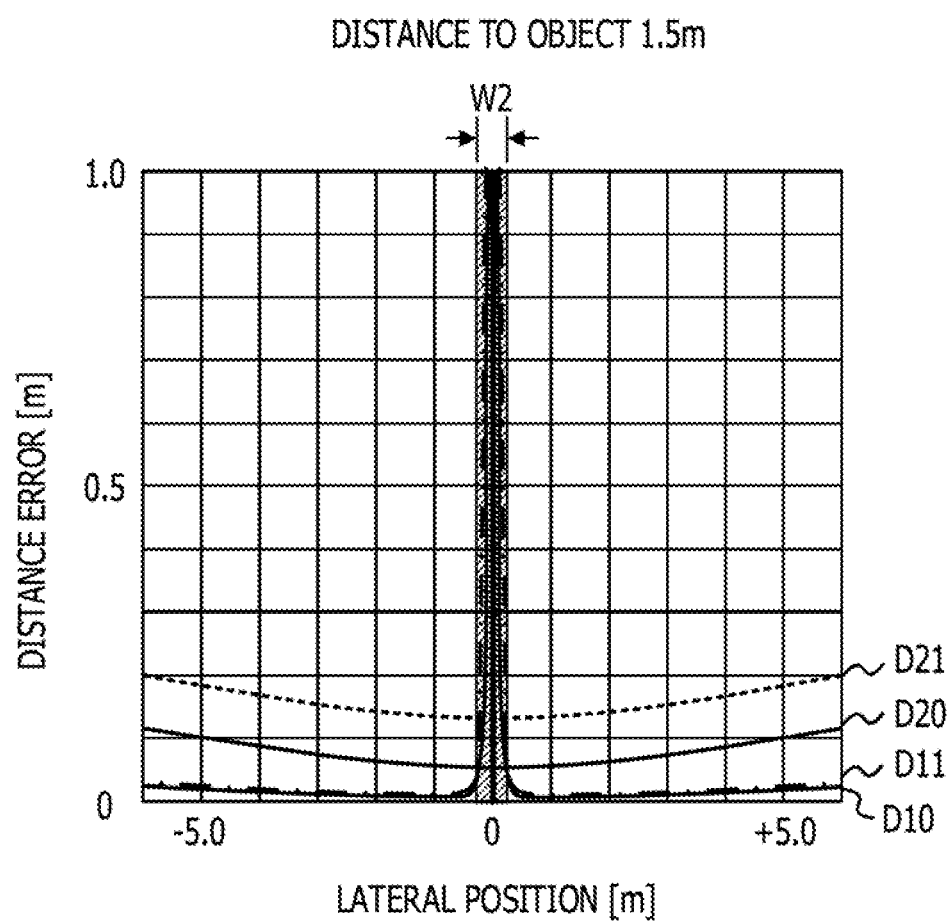
FIG. 12 is a chart (second chart) illustrating the characteristics of the first distance measurement method and the second distance measurement method.

FIG. 12 is a diagram illustrating the characteristics of the first distance measurement method and the second distance measurement method in a case where the distance to the object is 1.5 [m]. In the characteristics chart in FIG. 12, the abscissa axis indicates lateral position [m], and the ordinate axis indicates distance error [m], as in FIG. 11.

In FIG. 12, reference numerals D10, D11, D20, and D21 have the same meanings as those in FIG. 11. Specifically, a solid line D10 indicates the characteristics of the second distance measurement method measured under the condition that the distance to the object is 1.5 [m] (the characteristics may also be referred to as the characteristics D10), and a dot-and-dash line D11 indicates the characteristics of the second distance measurement method measured while the detection position of the object in a captured image is shifted by an amount equivalent to one pixel (the characteristics may also be referred to as the characteristics D11). Further, a solid line D20 indicates the characteristics of the first distance measurement method measured under the condition that the distance to the object is 1.5 [m] (the characteristics may also be referred to as the characteristics D20), and a dashed line D21 indicates the characteristics of the first distance measurement method measured while the detection position of the object in a captured image is shifted by an amount equivalent to one pixel (the characteristics may also be referred to as the characteristics D21).

A comparison between FIG. 12 and FIG. 11 shows that a range W2 in which the distance error is smaller in the characteristics D20 of the first distance measurement method than in the characteristics D10 of the second distance measurement method is narrower than the range W1 illustrated in FIG. 11. In other words, it is apparent from the characteristics illustrated in FIG. 12 that the region in which the control on selecting a distance measurement method on the basis of the amount of movement is effective is wider than that in the example illustrated in FIG. 11.

It becomes apparent from FIGS. 11 and 12 that, depending on the distance to the object, the region in which the distance measurement method selection control based on the amount of movement is effective might differ from the region in which the first distance measurement method should be prioritized regardless of the amount of movement. In one aspect, the distance to the object corresponds to the pixel position in the Y-axis direction (which may also be referred to as the vertical direction) in a captured image. For example, the greater the Y-coordinate value of a pixel in a captured image, or the closer the pixel to the lower side in the captured image, the shorter the distance from the monocular camera 20. For example, the Y-coordinate values of the pixel corresponding to an object whose distance from the monocular camera 20 is 1.5 [m] are greater than the Y-coordinate values of the pixels corresponding to an object whose distance from the monocular camera 20 is 3.0 [m]. Therefore, in one aspect, the above finding shows that, depending on the Y-coordinate values of the pixels in a captured image, the region in which the distance measurement method selection control based on the amount of movement is effective might differ from the region in which the first distance measurement method should be prioritized regardless of the amount of movement.

Figure 13:
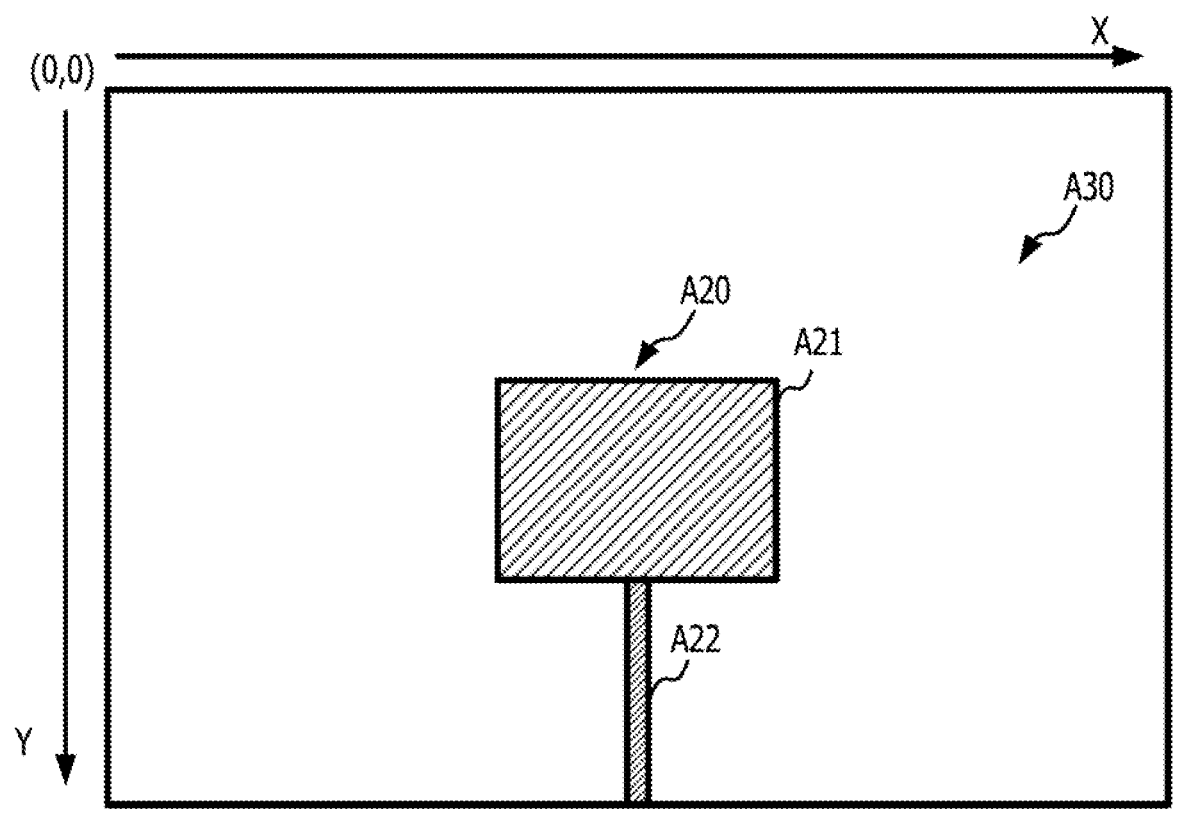
FIG. 13 is a diagram illustrating an example of regions in distance measurement method selection control.

FIG. 13 is a diagram illustrating an example of regions in the distance measurement method selection control. The example illustrated in FIG. 13 includes a first region A20 in which the first distance measurement method is to be selected regardless of the amount of movement, and a second region A30 in which the first distance measurement method or the second distance measurement method is appropriately selected in accordance with the amount of movement.

The first region A20 has appropriate widths along the ordinate axis and the abscissa axis in the vicinity of the captured image center corresponding to the optical axis of the monocular camera 20. In the example illustrated in FIG. 13, the first region A20 includes a first sub-region A21 having a horizontal width corresponding to the range W1 illustrated in FIG. 11, and a second sub-region A22 having a horizontal width corresponding to the range W2 illustrated in FIG. 12. In other words, the example illustrated in FIG. 13 shows a technical idea that, the greater the Y-coordinate values of the pixels in a captured image, the narrower the first region A20 in which the first distance measurement method is selected regardless of the amount of movement. Note that a pixel with a greater Y-coordinate value is located at a lower position in a captured image. Further, in other words, the example illustrated in FIG. 13 shows a technical idea that the width of the first sub-region A21, which is the upper end of the first region A20, is greater than the width of the second sub-region A22, which is the lower end of the first region A20.

In a modification of the example illustrated in FIG. 13, the second sub-region A22 may be omitted, and the first region A20 may be formed only with the first sub-region A21. Alternatively, in a modification of the example illustrated in FIG. 13, the number of the sub-regions constituting the first region A20 may be set to three or larger, and the first region A20 may be designed as a multi-stage region so that the width of each sub-region becomes smaller as the Y-coordinate values of the pixels in the captured image become greater. For example, the first region A20 may be shaped like a trapezoid whose lower base is smaller than the upper base.

Figure 14:
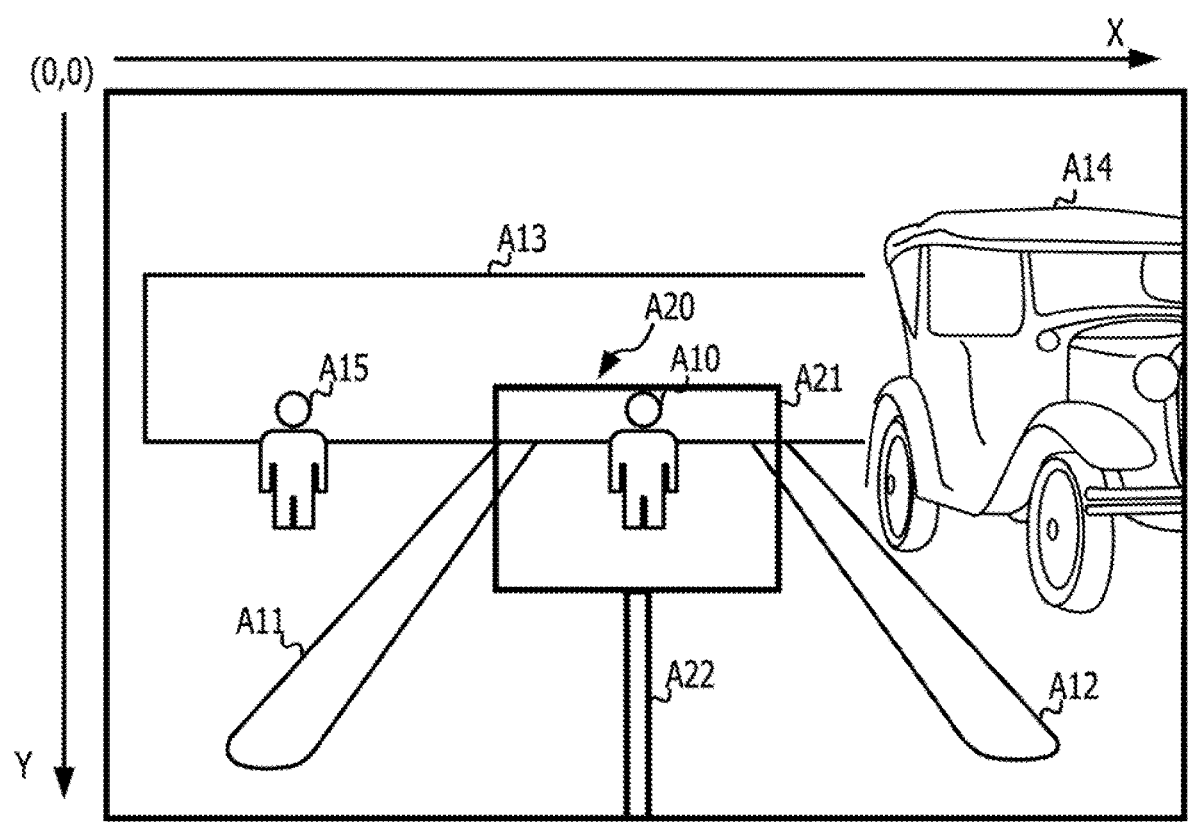
FIG. 14 is a diagram illustrating an example in which the boundaries of a first region are superimposed on an image captured by a monocular camera.

FIG. 14 is a diagram illustrating an example in which the boundaries of the first region A20 are superimposed on an image captured by the monocular camera 20. The example illustrated in FIG. 14 depicts a first pedestrian A10, white lines A11 and A12 that are drawn on the road surface and indicate the frame of a parking space, a wall A13, a vehicle A14 parked in an adjacent parking space, a second pedestrian A15, and the first region A20 including the first sub-region A21 and the second sub-region A22. Note that the first region A20 (the first sub-region A21 and the second sub-region A22) may not actually appear in the captured image.

In FIG. 14, the boundaries of the first region A20 (the first sub-region A21 and the second sub-region A22) are superimposed on the image captured by the monocular camera 20. Note that the image illustrated in FIG. 14 may be displayed on the user interface device 30. When the image is displayed on the user interface device 30, the boundary lines of the first region A20 may be superimposed on the image captured by the monocular camera 20 and be displayed, or may not be displayed at all.

In the example illustrated in FIG. 14, the pixels that capture the first pedestrian A10 exist in the first sub-region (which may also be referred to as the first region) inside the boundary A21. Therefore, a result of distance measurement conducted by the first distance measurement method is used for the pixels capturing the first pedestrian A10, regardless of the amount of movement of the vehicle 1. On the other hand, the pixels that capture the second pedestrian A15 exist outside the first region A20 (which may also be referred to as the second region). Therefore, a result of distance measurement conducted by the first distance measurement method or the second distance measurement method appropriately selected in accordance with the amount of movement of the vehicle 1 is used for the pixels that capture the second pedestrian A15.

As described above, in the fourth embodiment, an image captured by the monocular camera 20 is divided into a plurality of regions, and the distance measurement method selection control is varied for each region. Thus, an appropriate distance measurement method can be selected even in a case where the optimum distance measurement method may vary depending on displacement from the optical axis of the monocular camera 20. In the description below, a process flow in the vehicle parking support device 10 according to the fourth embodiment will be described.

Figure 15:
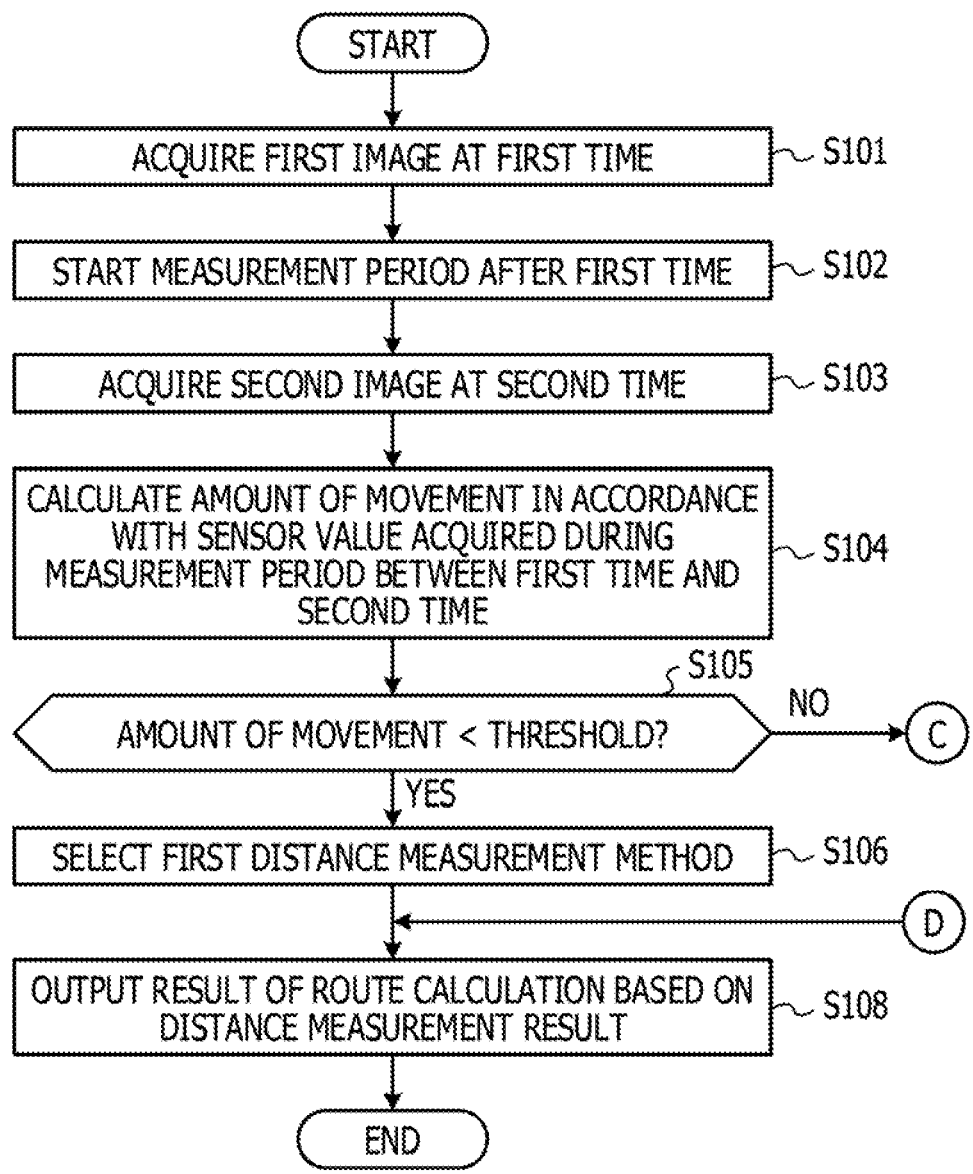
FIG. 15 is a chart (first chart) illustrating an example of a process flow in a vehicle parking support device according to a fourth embodiment.
Figure 16:
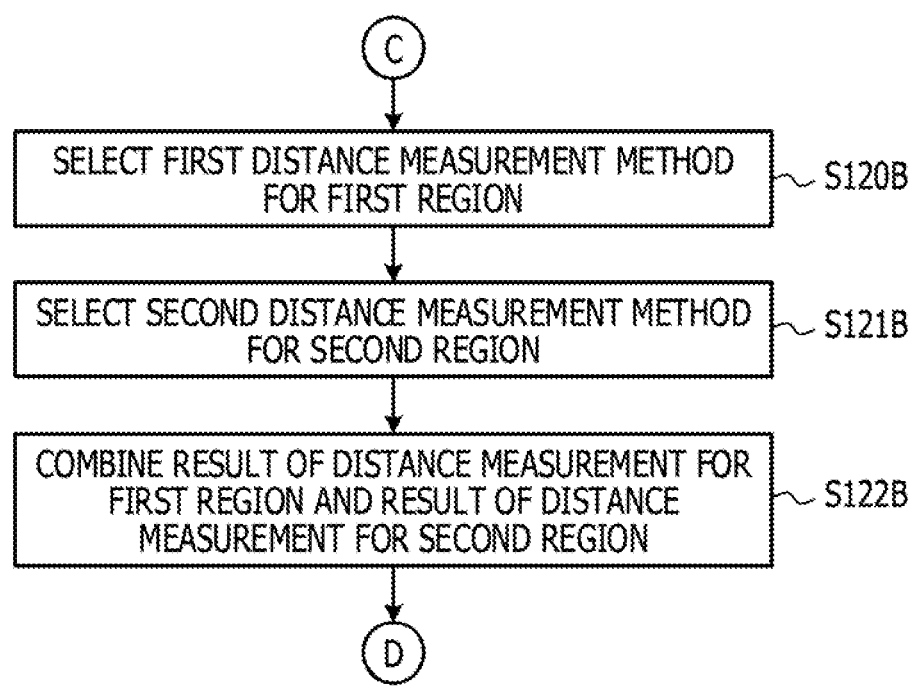
FIG. 16 is a chart (second chart) illustrating an example of a process flow in the vehicle parking support device according to the fourth embodiment.

FIGS. 15 and 16 are charts illustrating an example of a process flow in the vehicle parking support device 10 according to the fourth embodiment. In the process flow according to the fourth embodiment illustrated in FIG. 15, in a case where a plurality of images including a parallax for which the second distance measurement method is effective is obtained, the second distance measurement method is not invariably used for all pixels, but control is performed so that an appropriate distance measurement method will be selected for each region.

In the example illustrated in FIG. 15, processes S101 through S105 are the same as those in the example illustrated in FIG. 2. Specifically, if the amount of movement is determined to be smaller than the predetermined threshold (which may also be referred to as the first threshold) in the process S105 (YES in S105), the processing circuit 11 may select the first distance measurement method (S106), as in the first embodiment. In other words, in the process S106, the processing circuit 11 may output (acquire) a result of distance measurement conducted by the first distance measurement method.

If the amount of movement is determined to be equal to or larger than the predetermined threshold (which may also be referred to as the first threshold) in the process S105 (NO in S105), on the other hand, the processing circuit 11 does not invariably use the second distance measurement method for all the pixels, but performs control to select an appropriate distance measurement method for each region (S120B through S122B in FIG. 16).

In the process S120B, the processing circuit 11 selects the first distance measurement method for the pixels included in the first region A20, and acquires a result of distance measurement conducted by the first distance measurement method.

In the process S121B, the processing circuit 11 selects the second distance measurement method for the pixels included in the second region A30, and acquires a result of distance measurement conducted by the second distance measurement method.

In the process S122B, the processing circuit 11 combines a result of distance measurement conducted by the first distance measurement method for the first region A20 (this result may also be referred to as the first distance measurement result) and a result of distance measurement conducted by the second distance measurement method for the second region A30 (this result may also be referred to as the second distance measurement result), to output (acquire) a result of entire distance measurement (this result may also be referred to as the third distance measurement result or the combined distance measurement result).

On the basis of the result of the distance measurement conducted by the first distance measurement method, or the third distance measurement result (which may also be referred to as the combined distance measurement result) obtained by combining the first distance measurement result and the second distance measurement result, the processing circuit 11 then performs a route calculation process according to a predetermined route calculation algorithm for guiding the vehicle 1 to a parking space, and outputs a route calculation result (S108), as in the first embodiment.

As described above, an image captured by the monocular camera 20 is divided into a plurality of regions, and the distance measurement method selection control is varied for each region. Thus, an appropriate distance measurement method can be selected even in a case where the optimum distance measurement method may vary depending on displacement from the optical axis of the monocular camera 20. Such an action is advantageous in improving the accuracy of measurement of the distance from a moving body to the object on the basis of an image captured by the monocular camera 20.

Fifth Embodiment

A fifth embodiment introduces a technical idea that a plurality of monocular cameras 20 is installed in a vehicle 1 including a vehicle parking support device 10, to vary distance measurement method selection control with the installation positions of the respective monocular cameras 20.

Figure 17:
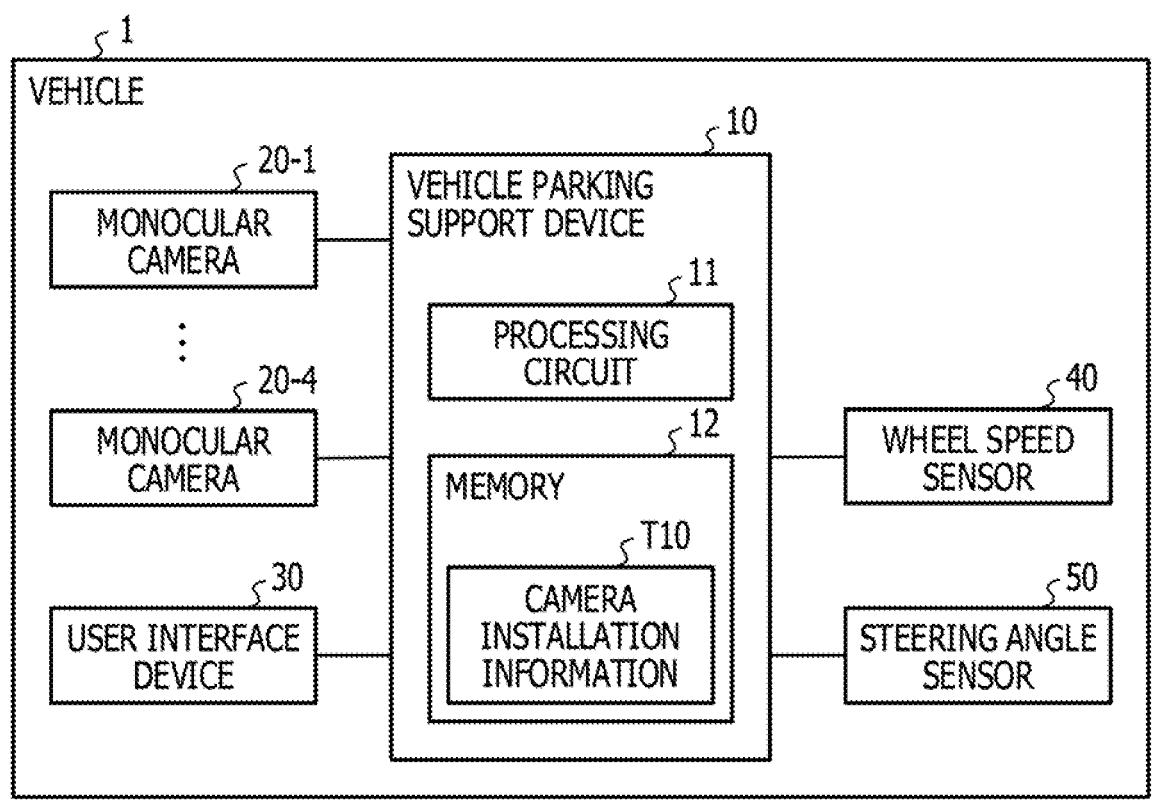
FIG. 17 is a diagram illustrating an example outline of the configuration of a vehicle that includes a vehicle parking support device according to a fifth embodiment.

FIG. 17 is a diagram illustrating an example outline of the configuration of the vehicle 1 that includes the vehicle parking support device 10 according to the fifth embodiment. The configuration of the vehicle 1 illustrated in FIG. 17 differs from the configuration of the second embodiment illustrated in FIG. 5 in that a plurality of monocular cameras 20-1 through 20-4 is added, and that camera installation information T10 is stored in the memory 12 of the vehicle parking support device 10. In the other aspects, the configuration of the vehicle 1 illustrated in FIG. 17 is the same as that illustrated in FIG. 5.

The monocular cameras 20-1 through 20-4 (which may also be collectively referred to as the monocular cameras 20) are installed at appropriate portions, with the respective optical axes extending the frontward direction of the vehicle 1, the rearward direction of the vehicle 1, the rightward direction of the vehicle 1, and the leftward direction of the vehicle 1, respectively. Each of the monocular cameras 20-1 through 20-4 may write the image data of a captured image into the memory 12 of the vehicle parking support device 10 at predetermined intervals (which may also be referred to as the frame rate), for example.

Note that the image data stored in the memory 12 has been associated with the monocular cameras 20 that generated the image data, and be then stored into the memory 12. For example, storage areas for storing image data may be provided for the respective monocular cameras 20-1 through 20-4. Specifically, the memory 12 may include a first storage area storing image data supplied from the first monocular camera 20-1, a second storage area storing image data supplied from the second monocular camera 20-2, a third storage area storing image data supplied from the third monocular camera 20-3, and a fourth storage area storing image data supplied from the fourth monocular camera 20-4.

In a modification of the above, for example, the memory 12 may have a single storage area storing image data supplied from the plurality of monocular cameras 20-1 through 20-4, and each of the monocular cameras 20-1 through 20-4 may hold the correspondence relationship between the monocular cameras 20 and image data by attaching the information for identifying the monocular cameras 20 to image data and writing the information into the memory 12. For example, the first monocular camera 20-1 may attach monocular camera identification information, which is information for identifying the first monocular camera 20-1, to the image data, and write the identification information into the memory 12.

The camera installation information T10 is information indicating the conditions for installation of each of monocular cameras 20-1 through 20-4. For example, the camera installation information T10 may include information indicating the optical axis directions of the monocular cameras as the installation conditions.

FIG. 18 is a table showing an example of the contents of the camera installation information T10. The camera installation information T10 in FIG. 18 includes camera identification information T11 and optical axis directions T12. The camera identification information T11 is the information with which the monocular cameras 20 mounted on the vehicle 1 can be identified, and may be formed with numbers, characters, symbols, or a combination thereof. The optical axis directions T12 are an example of information indicating conditions for installation of the monocular cameras 20 (the conditions may also be referred to as the installation modes), and indicate in which directions of the vehicle 1 the monocular cameras 20 are installed.

In FIG. 18, for example, the value "frontward" indicating that the optical axis direction T12 extends toward the front of the vehicle 1 is set for the monocular camera 20 having "camera #1" as its camera identification information T11. The value "rearward" indicating that the optical axis direction T12 extends toward the rear of the vehicle 1 is set for the monocular camera 20 having "camera #2" as its camera identification information T11. The value "leftward" indicating that the optical axis direction T12 extends toward the left side surface of the vehicle 1 is set for the monocular camera 20 having "camera #3" as its camera identification information T11. The value "rightward" indicating that the optical axis direction T12 extends toward the right side surface of the vehicle 1 is set for the monocular camera 20 having "camera #4" as its camera identification information T11.

Figure 19:
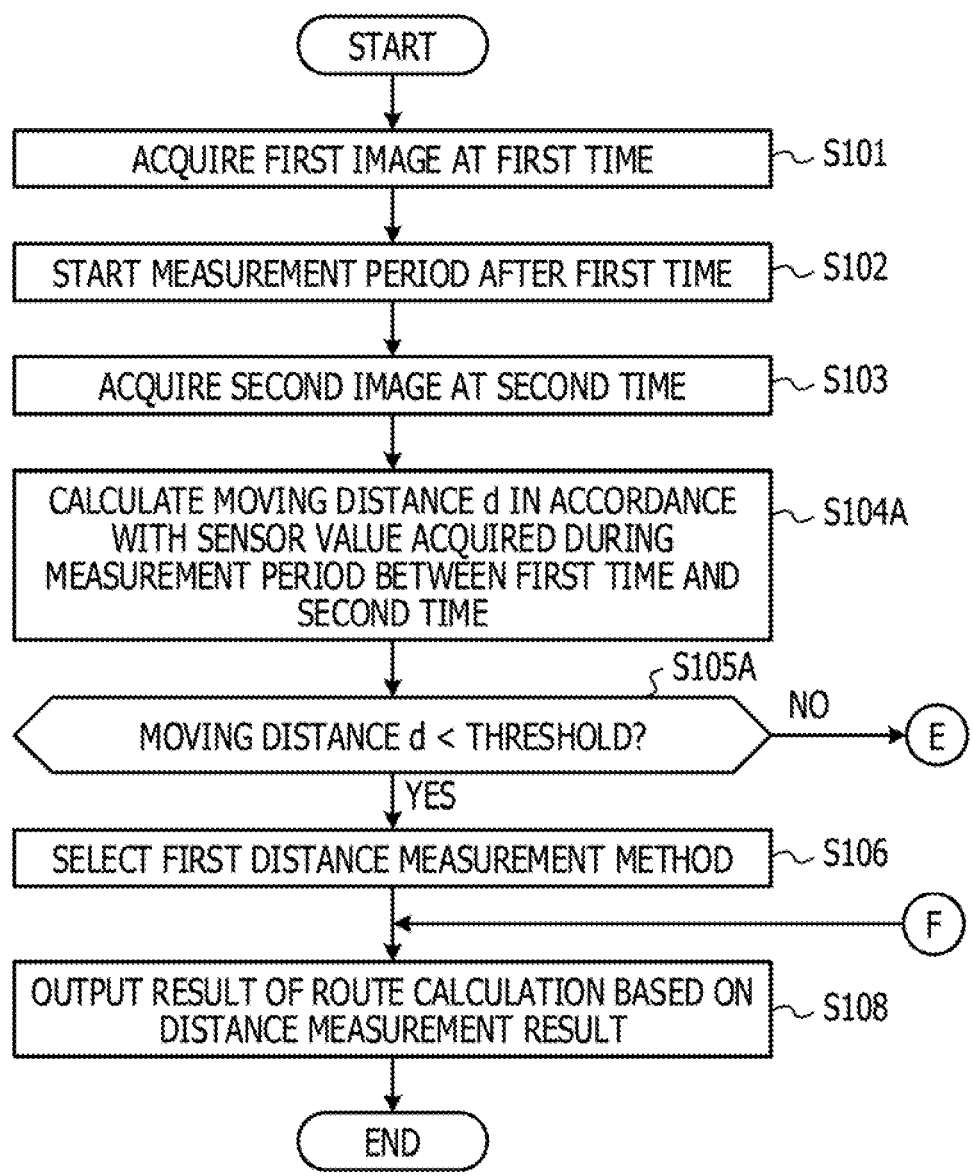
FIG. 19 is a chart (first chart) illustrating an example of a process flow in the vehicle parking support device according to the fifth embodiment.
Figure 20:
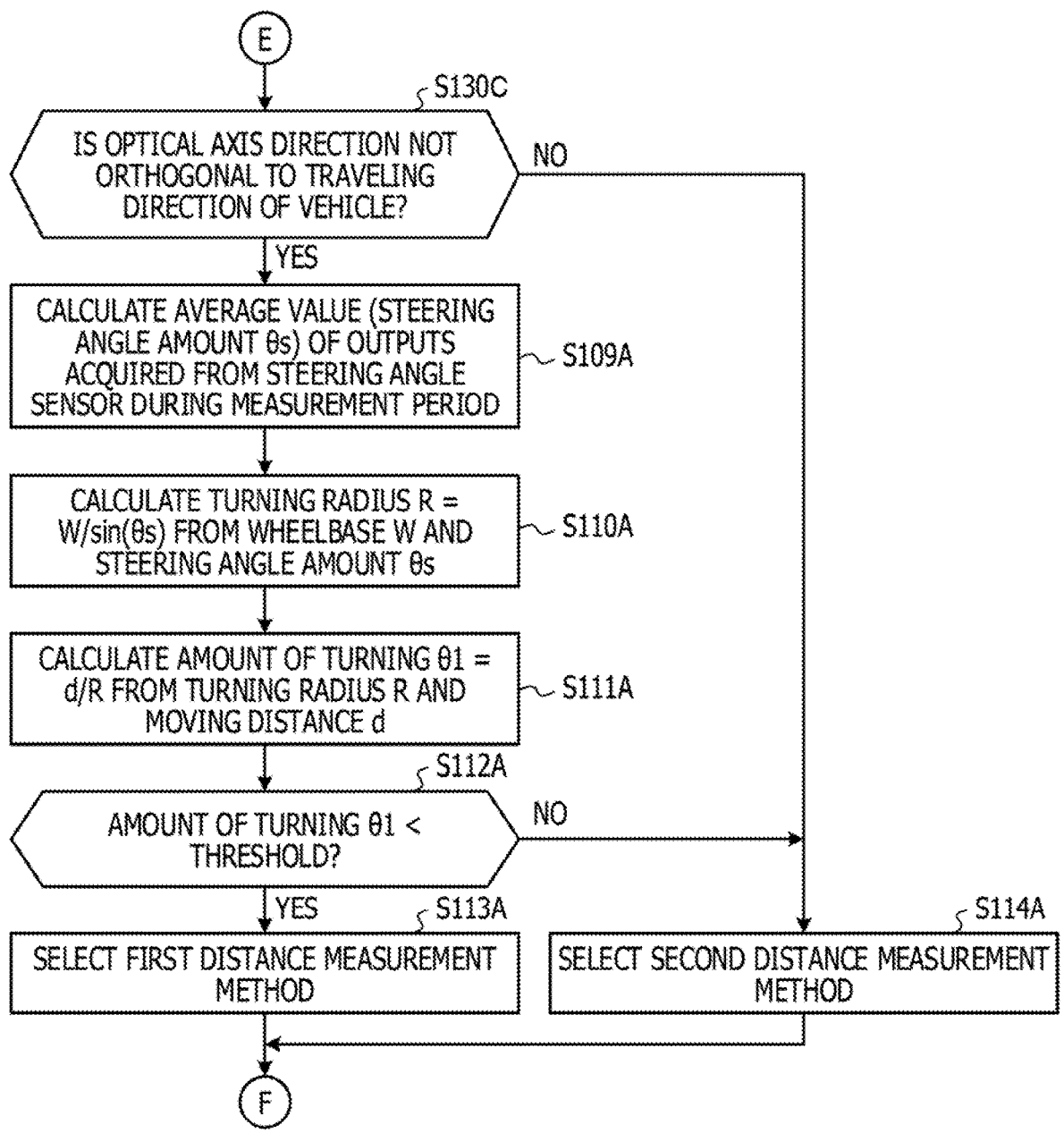
FIG. 20 is a chart (second chart) illustrating an example of a process flow in the vehicle parking support device according to the fifth embodiment.

FIGS. 19 and 20 are charts illustrating an example of a process flow in the vehicle parking support device 10 according to the fifth embodiment. The process flow according to the fifth embodiment illustrated in FIG. 19 is the same as the process flow according to the third embodiment illustrated in FIG. 9. In the fifth embodiment, however, the process flow illustrated in FIGS. 19 and 20 is executed for each of the monocular cameras 20.

For example, for each of the first monocular camera 20-1 through the fourth monocular camera 20-4, the processing circuit 11 performs the processes S101 through S103, to acquire the first image at the first time, and the second image at the second time, which is later than the first time. Note that the first time may be a different time for each of the monocular cameras 20, or may be the same time. The same applies to the second time.

In the process S104A, the processing circuit 11 calculates the moving distance d of the vehicle 1, on the basis of the sensor value acquired in the measurement period between the first time and the second time. If the moving distance d is determined to be shorter than the threshold in the process S105A (YES in S105A), the processing circuit 11 then selects the first distance measurement method for performing distance measurement using either the first image or the second image (S106).

If the moving distance d is determined to be equal to or longer than the threshold in the process S105A (NO in S105A), on the other hand, the processing circuit 11 proceeds on to the process flow illustrated in FIG. 20. In other words, in the fifth embodiment, third determination (S130C) based on the optical axis direction of the monocular camera 20 related to the first image and the second image is introduced.

In the process S130C, the processing circuit 11 determines whether the optical axis direction of the monocular camera 20 related to the first image and the second image is non-orthogonal to the traveling direction (which may also be referred to as the running direction or the moving direction) of the vehicle 1. In other words, the processing circuit 11 determines whether the optical axis direction of the monocular camera 20 related to the first image and the second image is "frontward" or "rearward". For example, in a case where the optical axis direction T12 acquired from the camera installation information T10 on the basis of the camera identification information associated with the first image and the second image is set at a value indicating "frontward" or "rearward", the processing circuit 11 may determine that the optical axis direction of the monocular camera 20 is non-orthogonal to the traveling direction of the vehicle 1. In a case where the optical axis direction T12 acquired from the camera installation information T10 is set at a value indicating "leftward" or "rightward", on the other hand, the processing circuit 11 may determine that the optical axis direction of the monocular camera 20 is orthogonal to the traveling direction of the vehicle 1.

Note that the camera identification information T11 may be attached to each image, or may be values associated with the storage areas in the memory 12. For example, the camera identification information "camera #1" for identifying the first monocular camera 20-1 may be associated with the first storage area in which image data supplied from the first monocular camera 20-1 is stored. Likewise, the camera identification information "camera #2" for identifying the second monocular camera 20-2 may be associated with the second storage area in which image data supplied from the second monocular camera 20-2 is stored. The camera identification information "camera #3" for identifying the third monocular camera 20-3 may be associated with the third storage area in which image data supplied from the third monocular camera 20-3 is stored. The camera identification information "camera #4" for identifying the fourth monocular camera 20-4 may be associated with the fourth storage area in which image data supplied from the fourth monocular camera 20-4 is stored.

If it is determined in the process S130C that the optical axis direction of the monocular camera 20 related to the first image and the second image is non-orthogonal to the traveling direction of the vehicle 1 (YES in S130C), the processing circuit 11 performs a series of processes (S109A through S112A) for the second determination based on the amount of turning θ1, as in the third embodiment. If the amount of turning θ1 is determined to be smaller than the second threshold (YES in S112A), the processing circuit 11 then selects the first distance measurement method for performing distance measurement using either the first image or the second image (S113A). If the amount of turning θ1 is determined to be equal to or larger than the second threshold (NO in S112A), on the other hand, the processing circuit 11 selects the second distance measurement method for performing distance measurement using both the first image and the second image (S114A).

If it is determined in the process S130C that the optical axis direction of the monocular camera 20 related to the first image and the second image is orthogonal to the traveling direction of the vehicle 1 (NO in S130C), the processing circuit 11 selects the second distance measurement method for performing distance measurement using both the first image and the second image (S114A). In other words, in a case where the optical axis direction of the monocular camera 20 related to the first image and the second image is neither "frontward" nor "rearward", the optical axis direction of the monocular camera 20 is not parallel to the axis in the traveling direction of the vehicle 1, and accordingly, a sufficient parallax can be obtained even in the vicinity of the optical axis of the monocular camera 20. Therefore, in a case where the optical axis direction of the monocular camera 20 related to the first image and the second image is determined not to be "frontward" or "rearward", the processing circuit 11 may skip the series of processes (S109A through S112A) for the second determination based on the amount of turning θ1.

As described above, in a case where the distance to the object is measured on the basis of an image captured with the monocular camera 20 mounted on the vehicle 1, the optimum distance measurement method can be selected in accordance with the amount of movement of the vehicle 1, and thus, distance measurement accuracy can be increased. Particularly, control on whether to perform the second determination based on the amount of turning θ1 is performed in accordance with the conditions (optical axis directions, for example) for installation of monocular cameras. Thus, the calculation costs in a case where a plurality of monocular cameras 20 is used can be reduced, while the decrease in the accuracy of the second distance measurement method is prevented. In other words, in a case where the optical axis direction of a monocular camera 20 is substantially parallel to the axis in the traveling direction of the vehicle 1, the second determination based on the amount of turning θ1 is performed. Such an action is advantageous in increasing response speed in real-time control while the accuracy of measurement of the distance from a moving body to the object on the basis of an image captured by the monocular camera 20 is increased.

From the above detailed description, the features and advantages of the embodiments will become apparent. This is intended to cover the features and advantages of the embodiments described above without departing from the spirit and the scope of the claims. Further, any person having ordinary knowledge in the technical field should be able to easily come up with various improvements and modifications. Therefore, there is no intention to limit the scope of the inventive embodiments to those described above, and appropriate improvements and equivalents included in the scope disclosed in the embodiments can be used. For example, the respective steps disclosed in this specification do not need to be carried out chronologically in the order described as an example of the processing flow, and the sequence of the steps may be changed within the scope of the gist of the present invention described in the claims. Alternatively, a plurality of steps may be carried out in parallel. Note that various situations that can occur in the vehicle parking support device 10 that are clarified in the above detailed description can be found when examined from one aspect, and other situations can be found when examined from other aspects. In other words, the features and advantages of the present invention are not limited to applications for solving the problems specified in the above detailed description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Vehicle
10 Vehicle parking support device
11 Processing circuit
12 Memory
20 Monocular camera
30 User interface device
40 Wheel speed sensor
50 Steering angle sensor

What is claimed is:

1. An information processing device comprising:
a memory; and
a processor coupled to the memory and configured to:
acquire, as a first process, a first image at a first time and a second image at a second time later than the first time from a monocular camera mounted on a vehicle;
calculate, as a second process, an amount of movement of the vehicle, based on a wheel speed pulse number which is measured by counting a wheel speed pulse from the vehicle by a wheel speed sensor during a measurement period between the first time and the second time;
output, as a third process, a result of distance measurement of a distance from the monocular camera to an object using a first distance measurement method to perform distance measurement using the first image or the second image, or a second distance measurement method to perform distance measurement using the first image and the second image, depending on the amount of movement; and
output, as a fourth process, a result of calculation of a route to guide the vehicle to a parking space, based on the result of distance measurement,
wherein the processor is configured to:
calculate, in the second process, a moving distance of the vehicle between the first time and the second time as the amount of movement of the vehicle using an expression of n×T×np/N where n represents the circumference ratio, T represents the tire diameter of the vehicle, np represents the wheel speed pulse number and N represents a wheel speed pulse number per tire rotation of the vehicle; output, in the third process, the result of distance measurement using the first distance measurement method in which the distance is calculated by an expression of H×f/Y where H represents a height of an installation position of the camera, f represents a design value of the camera and Y represents a height of an image of the object on an imaging surface when the moving distance calculated in the second process is shorter than a threshold;
calculate, in the second process, when the moving distance is not shorter than the threshold, an amount of turning generated by movement of the vehicle between the first time and the second time as the amount of movement of the vehicle;
output, in the third process, the result of distance measurement using the first distance measurement method when the amount of turning calculated in the second process is smaller than a threshold;
output, in the third process, the result of distance measurement using the second distance measurement method in which the distance is estimated based on a movement of the object on images captured by the monocular camera and an amount of displacement of the monocular camera which corresponds to the amount of movement of the vehicle when the amount of turning is not smaller than the threshold;
calculate the route based on the result of distance measurement;
output, in the fourth process, the calculated route; and
guide the vehicle to the parking space using the calculated route.

2. The information processing device according to claim 1, wherein the processor is configured to: calculate, in the second process, a moving distance of the vehicle between the first time and the second time as the amount of movement of the vehicle; and, in the third process, output a result of distance measurement using the first distance measurement method when the moving distance calculated in the second process is shorter than a threshold, and output a result of distance measurement using the second distance measurement method when the moving distance is not shorter than the threshold.

3. The information processing device according to claim 1, wherein the processor is configured to: calculate, in the second process, an amount of turning generated by movement of the vehicle between the first time and the second time as the amount of movement of the vehicle; output, in the third process, a result of distance measurement using the first distance measurement method when the amount of turning calculated in the second process is smaller than a threshold; and output, in the third process, a result of distance measurement using the second distance measurement method when the amount of turning is not smaller than the threshold.

4. The information processing device according to claim 1, wherein the memory is configured to store installation information indicating an optical axis direction of each monocular camera in a plurality of the monocular cameras mounted on the vehicle, wherein the processor is configured to: acquire, in the first process, the first image and the second image, from each of the monocular cameras mounted on the vehicle, which are associated with the respective monocular cameras; determine, in the third process, the optical axis direction of each monocular camera, based on the installation information corresponding to the monocular camera; and, when the optical axis direction of each monocular camera is orthogonal to a moving direction of the vehicle, output a result of distance measurement using the first distance measurement method when the moving distance calculated in the second process is shorter than the threshold, and output a result of distance measurement using the second distance measurement method when the moving distance is not shorter than the threshold.

5. The information processing device according to claim 1, wherein the processor is configured to: set, in the third process, a first region and a second region in each of the first image and the second image acquired in the first process and output a result of distance measurement using the first distance measurement method with respect to the first region.

6. The information processing device according to claim 5, wherein, a pixel which is located at an upper position in the first image and the second image is a pixel that captures a location at a longer distance from the vehicle, and a width of an upper end of the first region is equal to or greater than a width of a lower end of the first region.

7. A non-transitory computer-readable recording medium recording a vehicle parking support program for causing a computer to perform a process of:

acquiring, as a first process, a first image at a first time and a second image at a second time later than the first time from a monocular camera mounted on a vehicle;
calculating, as a second process, an amount of movement of the vehicle, based on a wheel speed pulse number which is measured by counting a wheel speed pulse from the vehicle by a wheel speed sensor during a measurement period between the first time and the second time;
outputting, as a third process, a result of distance measurement of a distance from the monocular camera to an object using a first distance measurement method for performing distance measurement using the first image or the second image, or a second distance measurement method for performing distance measurement using the first image and the second image, depending on the amount of movement;
outputting, as a fourth process, a result of calculation of a route for guiding the vehicle to a parking space, on the basis of the result of distance measurement;
calculating, in the second process, a moving distance of the vehicle between the first time and the second time as the amount of movement of the vehicle using an expression of $n \times T \times np/N$ where n represents the circumference ratio, T represents the tire diameter of the vehicle, np represents the wheel speed pulse number and N represents a wheel speed pulse number per tire rotation of the vehicle;
outputting, in the third process, the result of distance measurement result using the first distance measurement method in which the distance is calculated by an expression of $H \times f/Y$ where H represents a height of an installation position of the camera, f represents a design value of the camera and Y represents a height of an image of the object on an imaging surface when the moving distance calculated in the second process is shorter than a threshold;
calculating, in the second process, when the moving distance is not shorter than the threshold, an amount of turning generated by movement of the vehicle between the first time and the second time as the amount of movement of the vehicle; and
outputting, in the third process, a result of distance measurement using the first distance measurement method when the amount of turning calculated in the second process is smaller than a threshold;
outputting the result of distance measurement using the second distance measurement method in which the distance is estimated based on a movement of the object on images captured by the monocular camera and an amount of displacement of the monocular camera which corresponds to the amount of movement of the vehicle when the amount of turning is not smaller than the threshold;
calculating the route based on the result of distance measurement;
outputting, in the fourth process, the calculated route; and
guiding the vehicle to the parking space using the calculated route.

8. The non-transitory computer-readable recording medium according to claim 7, further comprising:
calculating, in the second process, a moving distance of the vehicle between the first time and the second time as the amount of movement of the vehicle;

outputting, in the third process, a result of distance measurement using the first distance measurement method when the moving distance calculated in the second process is shorter than a threshold; and outputting, in the third process, a result of distance measurement using the second distance measurement method when the moving distance is not shorter than the threshold.

9. The non-transitory computer-readable recording medium according to claim 7, further comprising:

calculating, in the second process, an amount of turning generated by movement of the vehicle between the first time and the second time as the amount of movement of the vehicle;

outputting, in the third process, a result of distance measurement using the first distance measurement method when the amount of turning calculated in the second process is smaller than a threshold; and outputting, in the third process, a result of distance measurement using the second distance measurement method when the amount of turning is not smaller than the threshold.

10. The non-transitory computer-readable recording medium according to claim 7, further comprising:

acquiring, in the first process, the first image and the second image, from each monocular camera in a plurality of the monocular cameras mounted on the vehicle, which are associated with the respective monocular cameras;

acquiring, in the third process, installation information corresponding to each monocular camera mounted on the vehicle from a memory that stores the installation information indicating an optical axis direction of each monocular camera;

determining the optical axis direction of each monocular camera based on the installation information; and when the optical axis direction of each monocular camera is orthogonal to a moving direction of the vehicle, outputting a result of distance measurement using the first distance measurement method when the moving distance calculated in the second process is shorter than the threshold, and outputting a result of distance measurement using the second distance measurement method when the moving distance is not shorter than the threshold.

11. The non-transitory computer-readable recording medium according to claim 7, further comprising:

setting, in the third process, a first region and a second region in each of the first image and the second image acquired in the first process; and outputting a result of distance measurement using the first distance measurement method with respect to the first region.

12. The non-transitory computer-readable recording medium according to claim 11, wherein, a pixel which is located at an upper position in the first image and the second image is a pixel that captures a location at a longer distance from the vehicle, and a width of an upper end of the first region is equal to or greater than a width of a lower end of the first region.

* * * * *